United States Patent
Chen et al.

(10) Patent No.: US 8,600,041 B2
(45) Date of Patent: Dec. 3, 2013

(54) METHOD AND APPARATUS FOR IMPROVING POWER OUTPUT EFFICIENCY OF LINE DRIVER

(75) Inventors: Liang Chen, Shenzhen (CN); Liru Dai, Shenzhen (CN); Li Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/565,532

(22) Filed: Aug. 2, 2012

(65) Prior Publication Data
US 2012/0294438 A1 Nov. 22, 2012

Related U.S. Application Data

(63) Continuation of application No. PCT/CN2010/071884, filed on Apr. 19, 2010.

(51) Int. Cl.
*H04M 1/00* (2006.01)

(52) U.S. Cl.
USPC .................... 379/413; 379/93.36

(58) Field of Classification Search
USPC .......... 379/93.36, 324, 395.01, 413; 327/108, 327/148, 157, 535, 536, 540, 553
See application file for complete search history.

(56) References Cited

U.S. PATENT DOCUMENTS

| | | | |
|---|---|---|---|
| 6,498,521 B1 | 12/2002 | Bicakci et al. | |
| 6,531,902 B1 * | 3/2003 | Tennen et al. | 327/108 |
| 6,633,751 B1 * | 10/2003 | Damgaard et al. | 455/126 |
| 6,931,108 B2 * | 8/2005 | Ludeman | 379/93.05 |
| 6,947,548 B2 * | 9/2005 | Ferianz | 379/399.01 |
| 8,344,761 B2 * | 1/2013 | Lakshmikumar et al. | 327/108 |
| 2006/0034359 A1 | 2/2006 | Hauptmann et al. | |
| 2006/0171527 A1 * | 8/2006 | Mills et al. | 379/395.01 |
| 2010/0080380 A1 * | 4/2010 | Zhou et al. | 379/413 |
| 2010/0080381 A1 * | 4/2010 | Tesu et al. | 379/413 |
| 2010/0253420 A1 * | 10/2010 | Xiao et al. | 327/540 |

FOREIGN PATENT DOCUMENTS

| | | |
|---|---|---|
| CN | 101359932 A | 2/2009 |
| CN | 101453336 A | 6/2009 |
| CN | 102246477 A | 11/2011 |

OTHER PUBLICATIONS

Written Opinion of the International Searching Authority dated Jan. 27, 2011 in connection with International Patent Application No. PCT/CN2010/071884.
International Search Report dated Jan. 27, 2011 in connection with International Patent Application No. PCT/CN2010/071884.
Supplementary European Search Report dated May 16, 2013 in connection with European Patent Application No. EP 10 85 0036.

* cited by examiner

*Primary Examiner* — Md S Elahee
*Assistant Examiner* — Akelaw Teshale

(57) ABSTRACT

A method and an apparatus for improving power output efficiency of a line driver are disclosed. The method includes: obtaining a current working parameter of an xDSL subscriber board, where the current working parameter includes at least one of a working mode configured on a subscriber port of the xDSL subscriber board and current output power of the subscriber port; and determining, according to the current working parameter, a control signal for a line driver in the xDSL subscriber board and outputting the control signal.

11 Claims, 9 Drawing Sheets

---

S100: Obtain a current working parameter of an xDSL subscriber board

S110: Determine a control signal for a line driver in the xDSL subscriber board according to the obtained current working parameter, and output the control signal

METHOD AND APPARATUS FOR IMPROVING POWER OUTPUT EFFICIENCY OF LINE DRIVER

CROSS-REFERENCE TO RELATED APPLICATIONS

This application is a continuation of International Application No. PCT/CN2010/071884, filed on Apr. 19, 2010, which is hereby incorporated by reference in its entirety.

TECHNICAL FIELD

The present invention relates to the field of network communications technologies, and in particular, to an xDSL subscriber board technology.

BACKGROUND

An x Digital Subscriber Loop (x digital subscriber Loop, xDSL) technology includes: an Asymmetrical Digital Subscriber Loop (asymmetrical digital subscriber Loop, ADSL) technology, and a Very-high-speed Digital Subscriber line2 (very-high-speed digital subscriber line2, VDSL2) technology. The VDSL2 technology is applied in a broadband access device more and more widely.

A line driver of an xDSL subscriber board, for example, a VDSL2 subscriber board, is generally a class AB line driver (also called a CLASS AB line driver). A power supply voltage (V+ and V−) of the class AB line driver generally needs to satisfy a maximum voltage swing requirement of an output signal. However, in most cases, the output signal of the VDSL2 subscriber board is a small voltage swing signal, and a proportion of large voltage swing signals is small, so that currently a problem of low power output efficiency exists in the line driver of the VDSL2 subscriber line board.

In order to improve the power output efficiency of the line driver of the xDSL subscriber board, for example, the VDSL2 subscriber board, a currently-adopted method includes: adopting a class H line driver (also called a CLASS H line driver) as the line driver of the VDSL2 subscriber board, where the class H line driver includes the class AB line driver and a signal detection and charge pump circuit. The signal detection and charge pump circuit is configured to detect a voltage swing of an input signal. When the voltage swing of the input signal exceeds a predetermined threshold level, the signal detection and charge pump circuit linearly adjusts a power supply voltage of the class AB line driver according to a signal waveform of an excessive part, so that the power supply voltage of the class AB line driver can follow a voltage waveform of an output signal. In this way, when a subscriber port of the VDSL2 subscriber board outputs a small voltage swing signal, the power supply voltage of the class AB line driver is of a small voltage value, thus improving the power output efficiency of the class AB line driver and reducing energy consumption of the VDSL2 subscriber board.

In the process of implementing the present invention, the inventor finds that: The subscriber port of the xDSL subscriber board, for example, the VDSL2 subscriber board, generally supports a various working modes (for example, working modes such as 12a, 17a, 8b, and ADSL2+ specified in the ITU standards), and a big difference exists between maximum transmission power of signals on the subscriber port in different working modes and a big difference exists between voltage peak-to-average ratios of signals on the subscriber port in different working modes, but the power supply voltage provided for the class H line driver and the predetermined threshold level are fixed, so that the subscriber port of the xDSL subscriber board, for example, the VDSL2 subscriber board, cannot achieve optimal power output efficiency in various working modes. Furthermore, static power consumption of the class H line driver including the signal detection and charge pump circuit is higher than that of the class AB line driver. In this way, when the subscriber port outputs a small power signal, the power consumption of the class H line driver is higher than that of the class AB line driver.

SUMMARY

A method and an apparatus for improving power output efficiency of a line driver according to the embodiments of the present invention may improve power output efficiency of a line driver in an xDSL subscriber board, thus reducing energy consumption of the xDSL subscriber board, for example, a VDSL2 subscriber board.

An embodiment of the present invention provides a method for improving power output efficiency of a line driver, where the method includes:

obtaining a current working parameter of an xDSL subscriber board, where the current working parameter includes at least one of a working mode configured on a subscriber port of the xDSL subscriber board and current output power of the subscriber port; and determining, according to the current working parameter, a control signal that matches the current working parameter for a line driver in the xDSL subscriber board, and outputting the control signal, where the control signal includes at least one of a first control signal, a second control signal, and a third control signal, the first control signal is used to control a minimum undistorted power supply voltage provided for the line driver, the second control signal is used to control a predetermined threshold level in a signal detection and charge pump circuit of the line driver, and the third control signal is used to control enabling/disabling of the signal detection and charge pump circuit.

An embodiment of the present invention provides an apparatus for improving power output efficiency of a line driver, where the apparatus includes:

an obtaining unit, configured to obtain a current working parameter of an xDSL subscriber board, where the current working parameter includes at least one of a working mode configured on a subscriber port of the xDSL subscriber board and current output power of the subscriber port; and a control unit, configured to determine, according to the current working parameter, a control signal that matches the current working parameter for a line driver in the xDSL subscriber board, and output the control signal, where the control signal includes at least one of a first control signal, a second control signal, and a third control signal; the first control signal is used to control a minimum undistorted power supply voltage provided for the line driver, the second control signal is used to control a predetermined threshold level in a signal detection and charge pump circuit of the line driver, and the third control signal is used to control enabling/disabling of the signal detection and charge pump circuit.

An embodiment of the present invention provides an xDSL subscriber board, which includes a line driver and a power source module, where the line driver includes a signal detection and charge pump circuit, the power source module provides a minimum undistorted voltage for the line driver, and the subscriber board further includes:

a control module, configured to: obtain a current working parameter of the xDSL subscriber board, where the current working parameter includes: at least one of a working mode configured on a subscriber port of the xDSL subscriber board and current output power of the subscriber port; and determine, according to the current working parameter, a control signal that matches the current working parameter for a line driver in the xDSL subscriber board, and output the control signal, where the control signal includes at least one of a first control signal, a second control signal, and a third control signal; the first control signal is used to control a minimum undistorted power supply voltage provided by the power source module for the line driver, the second control signal is used to control a predetermined threshold level in the signal detection and charge pump circuit, and the third control signal is used to control enabling/disabling of the signal detection and charge pump circuit.

It can be known from the description of the foregoing technical solutions that, the control signal is generated by using at least one parameter of the working mode configured on the subscriber port of the xDSL subscriber board and the current output power. When the control signal is used to control the minimum undistorted power supply voltage of the line driver, the phenomenon of unnecessary energy consumption waste caused by a too high voltage provided for the line driver may be avoided. When the control signal is used to control the predetermined threshold level in the signal detection and charge pump circuit, the phenomenon that the power supply voltage of the line driver unnecessarily follows a waveform of an output signal or cannot follow a waveform of an output signal in time, which is caused by that different working modes correspond to the same predetermined threshold level, may be avoided. When the control signal is used to control enabling/disabling of the signal detection and charge pump circuit, the phenomenon of unnecessary energy consumption waste of the signal detection and charge pump circuit may be avoided. Therefore, it can be known that, through the foregoing technical solutions, the minimum undistorted power supply voltage, the predetermined threshold level, or the enabling/disabling of the signal detection and charge pump circuit can be enabled to match at least one parameter of the working mode configured on the subscriber port and the current output power, thus improving the power output efficiency of the line driver of the xDSL subscriber board and reducing the energy consumption of the xDSL subscriber board through the foregoing technical solutions.

BRIEF DESCRIPTION OF THE DRAWINGS

To illustrate the technical solutions according to the embodiments of the present invention or in the prior art more clearly, accompanying drawings required for describing the embodiments or the prior art are introduced briefly in the following. Apparently, the accompanying drawings in the following description are only some embodiments of the present invention, and persons of ordinary skill in the art may further obtain other drawings according to the accompanying drawings without creative efforts.

DETAILED DESCRIPTION

Specific implementation processes for using at least one parameter of a working mode configured on a subscriber port of an xDSL subscriber board and current output power to generate a control signal, and using the control signal to control a minimum undistorted power supply voltage provided for a line driver, a predetermined threshold level in a signal detection and charge pump circuit, and/or enabling/disabling of the signal detection and charge pump circuit according to the present invention are illustrated in the following through embodiments. Obviously, the embodiments to be described below are part of rather than all of the embodiments of the present invention. All other embodiments obtained by persons of ordinary skill in the art based on the embodiments of the present invention without creative efforts shall fall within the protection scope of the present invention.

Embodiment 1: Method for improving power output efficiency of a line driver. A procedure of the method is as shown in FIG. 1.

Figure 1:
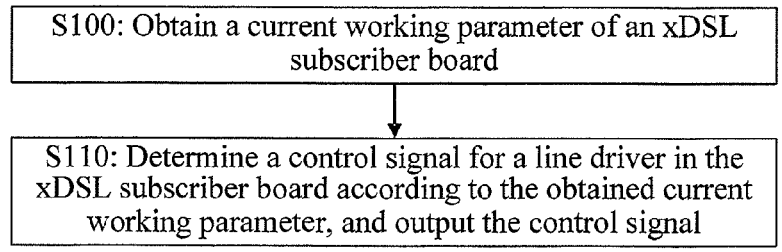
FIG. 1 is a flow chart of a method for improving power output efficiency of a line driver according to a first embodiment of the present invention.

In FIG. 1, S100: Obtain a current working parameter of an xDSL subscriber board. The current working parameter includes at least one of a working mode configured on a subscriber port of the xDSL subscriber board and current output power of the subscriber port.

The configured working mode may be obtained before the subscriber port of the xDSL subscriber board is initialized. If the xDSL subscriber board may change the working mode configured on the subscriber port in a working process and the changed configured working mode may be successfully activated in a normal working process of the subscriber port, the working mode configured on the subscriber port may be obtained at regular time. The current output power of the subscriber port may be obtained in the initialization process of the subscriber port, and may also be obtained in real time in the normal working process of the subscriber port. Here, the current output power of the subscriber port may be obtained by detecting an actual output of the subscriber port, and may also be obtained through calculation according to the size of an input signal.

S110: Determine a control signal for a line driver in the xDSL subscriber board according to the obtained current working parameter, and output the control signal. Here, the control signal includes at least one of a first control signal, a second control signal, and a third control signal. The first control signal is used to control a minimum undistorted power supply voltage provided for the line driver (for example, a minimum undistorted power supply voltage provided for a class H line driver), that is, the first control signal controls a power source module that provides a voltage for the line driver, so that the power source module provides a corresponding power supply voltage for the line driver according to the first control signal. The second control signal is used to control a predetermined threshold level in a signal detection and charge pump circuit. The predetermined threshold level is a voltage threshold value of an input signal for enabling the power supply voltage of the line driver (for example, a class AB line driver in the class H line driver) to follow a voltage waveform of an output signal, that is, when a voltage swing of the input signal exceeds the predetermined threshold level, the power supply voltage of the class AB line driver in the class H line driver follows the voltage waveform of the output signal. The third control signal is used to control enabling/disabling of the signal detection and charge pump circuit, that is, the third control signal controls whether the signal detection and charge pump circuit works. The signal detection and charge pump circuit is a signal detection circuit and a charge pump circuit.

In S110, a principle for determining the control signal for the line driver in the xDSL subscriber board according to the obtained current working parameter may be: The control signal matches the current working parameter. That is, the power supply voltage provided for the line driver in the xDSL subscriber board may match the working mode configured on the subscriber port, the power supply voltage provided for the line driver in the xDSL subscriber board may match the current output power of the subscriber port, the predetermined threshold level in the signal detection and charge pump circuit may match the working mode configured on the subscriber port, an enabling/disabling state of the signal detection and charge pump circuit may match the working mode configured on the subscriber port, and the enabling/disabling state of the signal detection and charge pump circuit may match the working mode configured on the subscriber port and the current output power of the subscriber port. A working state of the line driver and the current working parameter of the xDSL subscriber board are enabled to match each other by enabling the control signal and the current working parameter to match each other, thus reducing unnecessary energy consumption of the line driver in the xDSL subscriber board. Here, the unnecessary energy consumption of the line driver may be incurred by unnecessary work of the signal detection and charge pump circuit, or by providing a power supply voltage which is higher than that required by the current output power for the line driver, or by unnecessarily enabling, by the signal detection and charge pump circuit and according to the predetermined threshold level, the power supply voltage of the line driver to follow the waveform of the output signal.

A first specific implementation example of S110 is as follows. A corresponding relationship between the working mode of the subscriber port and the minimum undistorted power supply voltage provided for the line driver is preset. Before the subscriber port of the xDSL subscriber board is initialized, a minimum undistorted power supply voltage corresponding to the working mode configured on the subscriber port is determined according to the preset corresponding relationship. The first control signal is output according to the minimum undistorted power supply voltage corresponding to the configured working mode, so as to control the power supply voltage provided by the power source module for the line driver as the minimum undistorted power supply voltage corresponding to the configured working mode. The minimum undistorted power supply voltage is a minimum voltage value satisfying a voltage requirement of the line driver (for example, the class H line driver including the signal detection and charge pump circuit and the class AB). The minimum undistorted power supply voltage of the line driver in the foregoing corresponding relationship is preset for a signal characteristic on the subscriber port in the working mode. Here, the signal characteristic is, such as, maximum output power, a voltage peak-to-average ratio of the output signal, a voltage drop value of a diode, a headroom voltage of the class AB line driver connected to the signal detection and charge pump circuit, and voltage fluctuation that are on the subscriber port in a working mode. A specific manner for setting the minimum undistorted power supply voltage in the corresponding relationship is illustrated with reference to a specific circuit in the following embodiment.

A second specific implementation example of S110 is as follows. A corresponding relationship between the working mode of the subscriber port and the predetermined threshold level in the signal detection and charge pump circuit is preset. A predetermined threshold level corresponding to the working mode configured on the subscriber port is determined according to the preset corresponding relationship. The second control signal is output according to the predetermined threshold level corresponding to the configured working mode, so as to control the predetermined threshold level in the signal detection and charge pump circuit as the predetermined threshold level corresponding to the configured working mode. The predetermined threshold level in the foregoing corresponding relationship is preset for the minimum undistorted power supply voltage provided for the line driver in the working mode. Here, the predetermined threshold level may be a starting voltage for the signal detection and charge pump circuit to raise the power supply voltage of the class AB line driver.

A third specific implementation example of S110 is as follows. When it is judged that the working mode configured on the subscriber port is a first mode, the third control signal for disabling the signal detection and charge pump circuit is output to control the signal detection and charge pump circuit to be in a work stopping state. The first mode is a working mode in which a frequency of an output signal of the subscriber port is high and maximum output power of the output signal is low. Here, the high frequency and the low power may be measured according to whether the frequency is higher than a frequency threshold and whether the power is lower than a power threshold. Values of the frequency threshold and the power threshold may be set according to an actual application situation of the xDSL subscriber board. For example, the frequency threshold may be set according to voltage raising performance of the signal detection and charge pump circuit in the xDSL subscriber board, and the power threshold may be set according to a minimum undistorted voltage provided for the line driver in the xDSL subscriber board, so that the power consumption of the signal detection and charge pump circuit is not greater than power consumption saving of the class AB line driver. An example of setting the frequency threshold is as follows. If when the frequency of the output signal of the subscriber port is higher than a certain frequency, the signal detection and charge pump circuit cannot raise the power supply voltage $V+$ and $V-$ of the class AB line driver in time to ensure that the power supply voltage $V+$ and $V-$ is temporally synchronous with an output signal of a large voltage swing, the certain frequency is the frequency threshold.

It should be noted for the foregoing third specific example that, an initial default state of the signal detection and charge pump circuit is enabling. For example, in the initialization process of the subscriber port, before receiving the third control signal for disabling the signal detection and charge pump circuit, the signal detection and charge pump circuit is always in the enabling state.

A fourth specific implementation example of S110 is as follows. When it is judged that the working mode configured on the subscriber port is a second mode and the obtained current output power is less than a predetermined power value corresponding to the second mode, the third control signal for disabling the signal detection and charge pump circuit is output to control the signal detection and charge pump circuit to be in the work stopping state. Another condition for outputting the third control signal for disabling the signal detection and charge pump circuit may be added, which is that the signal detection and charge pump circuit is currently in a work enabling state. That is to say, when it is judged that the configured working mode is the second mode, the obtained current output power is less than the predetermined power value corresponding to the second mode, and the signal detection and charge pump circuit is currently in the work enabling state, the third control signal for disabling the signal detection and charge pump circuit is output. Here, "less than" may also be changed to "less than or equal to". The second mode is a working mode in which the frequency of the output signal of the subscriber port is low and the maximum output power of the output signal is high. Here, the low frequency and the high power may be measured according to whether the frequency is lower than a frequency threshold and whether the power is higher than a power threshold. Values of the frequency threshold and the power threshold may be set according to an actual application situation of the xDSL subscriber board, as specifically described in the foregoing third specific implementation example. Details are not repeatedly described here. Furthermore, the second mode here includes at least one working mode. When the second mode includes multiple types of working modes, each type of working mode included in the second mode may correspond to a different predetermined power value. In this case, the predetermined power value corresponding to the second mode is a predetermined power value corresponding to the configured working mode.

A fifth specific implementation example of S110 is as follows. When it is judged that the working mode configured on the subscriber port is the second mode and the obtained current output power is not less than the predetermined power value corresponding to the second mode, the third control signal for enabling the signal detection and charge pump circuit is output to control the signal detection and charge pump circuit to be in a working state. Another condition for outputting the third control signal for enabling the signal detection and charge pump circuit may be added, which is that the signal detection and charge pump circuit is currently in the work stopping state. That is to say, when it is judged that the configured working mode is the second mode, the obtained current output power is not less than the predetermined power value corresponding to the second mode, and the signal detection and charge pump circuit is currently in the work stopping state, the third control signal for enabling the signal detection and charge pump circuit is output. Here, the "not less than" may also be changed to "greater than". It should be noted that, the fourth specific implementation example and the fifth specific implementation example may be used as two branches in parallel. In the case of parallel use, when "less than" in the fourth specific implementation example is changed to "less than or equal to", "not less than" in the fifth specific implementation example should be changed to "greater than".

A sixth specific implementation example of S110 is as follows. After the signal detection and charge pump circuit is disabled, for example, after the third control signal for disabling the signal detection and charge pump circuit is output, the minimum undistorted power supply voltage provided for the line driver is calculated according to the current output power of the subscriber port, and the first control signal is output according to the calculated minimum undistorted power supply voltage, so as to control the power supply voltage provided by the power source module for the line driver as the minimum undistorted power supply voltage calculated according to the current output power.

S110 may include any one or more or all of the foregoing six specific implementation examples. When S110 includes the foregoing six specific implementation examples, the energy consumption of the xDSL subscriber board may be reduced to a greatest degree.

It should be noted that, the first embodiment is described with respect to one subscriber port in the xDSL subscriber board. If the xDSL subscriber board includes a plurality of subscriber ports, the technical content recorded in the foregoing embodiment may be applicable to every subscriber port separately. Furthermore, the plurality of subscriber ports in the xDSL subscriber board may work in the same working mode or in different working modes. Each subscriber port may correspond to a line driver (for example, the class H line driver including the signal detection and charge pump circuit and the class AB line driver) respectively, that is, the number of line drivers may be the same as the number of subscriber ports. Specific implementation manners of the subscriber port and the line driver that are in the xDSL subscriber board are not limited in the embodiment.

In the first embodiment, the control signal is generated by using at least one parameter of the working mode configured on the subscriber port of the xDSL subscriber board and the current output power of the subscriber port. When the control signal is used to control the minimum undistorted power supply voltage provided for the line driver, the phenomenon of unnecessary energy consumption waste caused by the too high voltage provided for the line driver may be avoided. When the control signal is used to control the predetermined threshold level in the signal detection and charge pump circuit, the phenomenon that the power supply voltage of the line driver unnecessarily follows the waveform of the output signal or cannot follow the waveform of the output signal in time, which is caused by that different working modes correspond to the same predetermined threshold level, may be avoided. When the control signal is used to control the enabling/disabling of the signal detection and charge pump circuit, the phenomenon of unnecessary energy consumption waste of the signal detection and charge pump circuit may be avoided. Therefore, through the first embodiment, the minimum undistorted power supply voltage provided for the line driver, the predetermined threshold level in the signal detection and charge pump circuit, or the enabling/disabling of the signal detection and charge pump circuit can be enabled to match at least one parameter of the working mode configured on the subscriber port and the current output power, thus improving the power output efficiency of the xDSL subscriber board and eventually reducing the energy consumption of the xDSL subscriber board through the first embodiment.

Embodiment 2: Method for improving power output efficiency of a line driver. A procedure of the method is as shown in FIG. 2.

Figure 2:
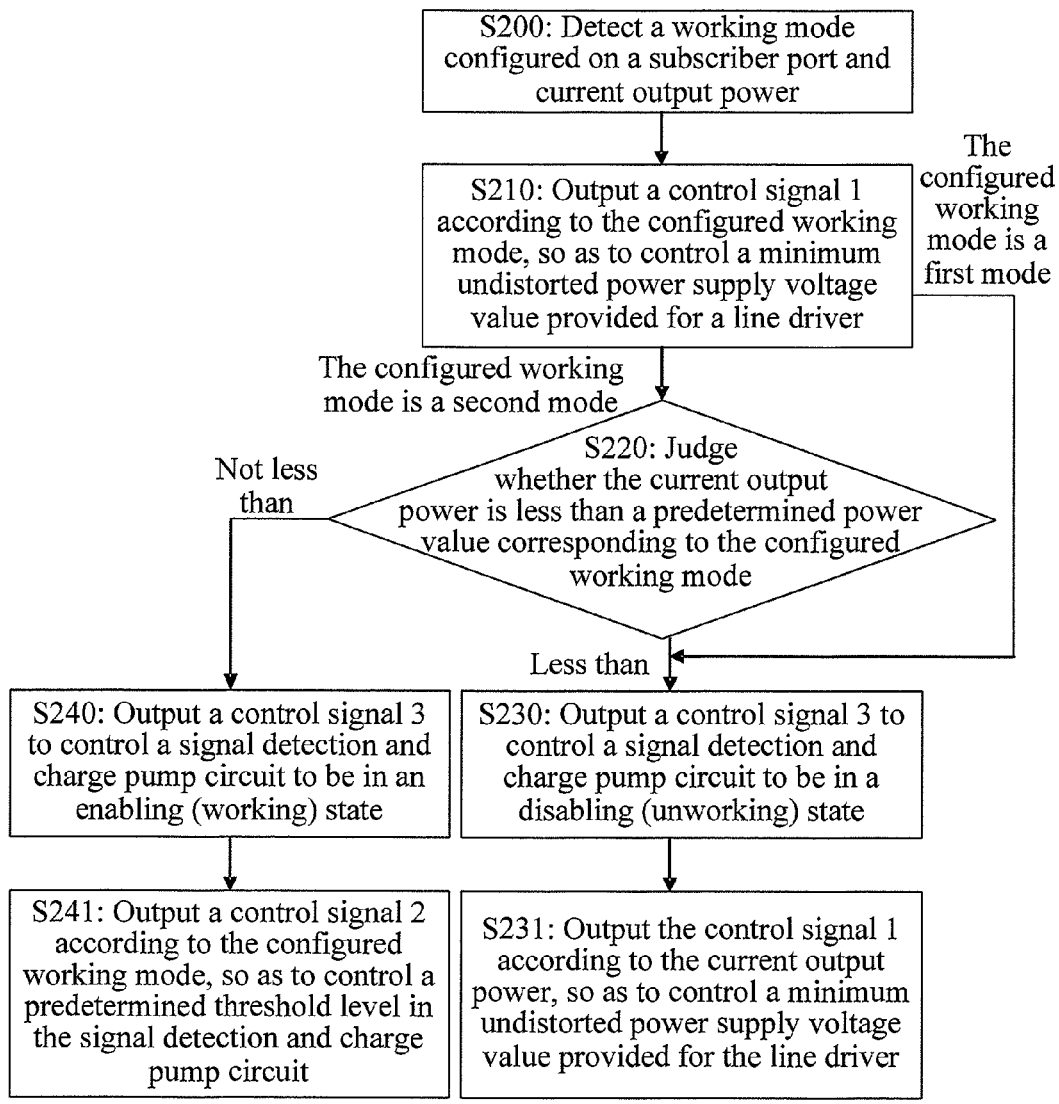
FIG. 2 is a flow chart of a method for improving power output efficiency of a line driver according to a second embodiment of the present invention.

In FIG. 2, S200: Before a subscriber port of an xDSL subscriber board is initialized, detect a working mode configured on the subscriber port of the xDSL subscriber board. S200 may further include: obtaining current output power of the subscriber port in a normal working process of the subscriber port.

S210: Output a control signal 1 (that is, the first control signal) according to the configured working mode, so as to control, by using the control signal 1, a voltage provided by a power source module for a line driver (for example, a class H line driver) corresponding to the subscriber port in the xDSL subscriber board as a minimum undistorted power supply voltage VS+ corresponding to the working mode configured on the subscriber port. Furthermore, if the working mode configured on the subscriber port is a first mode, the procedure proceeds to S230; if the working mode configured on the subscriber port is not a first mode, the procedure proceeds to S220.

In S210, the minimum undistorted power supply voltage VS+ corresponding to the configured working mode may be determined according to a preset corresponding relationship between the working mode and the minimum undistorted power supply voltage.

S220: Judge whether the current output power of the subscriber port is less than a predetermined power value corresponding to the configured working mode. Different working modes of the subscriber port may correspond to different predetermined power values. The predetermined power value corresponding to the working mode configured on the subscriber port may be determined according to a preset corresponding relationship between the working mode and the predetermined power value. If the current output power of the subscriber port is not obtained in S200, in S220, the current output power of the subscriber port may be obtained in real time, and the current output power is compared with the predetermined power value corresponding to the working mode configured on the subscriber port. If the current output power is less than the predetermined power value corresponding to the working mode configured on the subscriber port, the procedure proceeds to S230; if the current output power is not less than the predetermined power value corresponding to the working mode configured on the subscriber port, the procedure proceeds to S240.

S230: Output a control signal 3 (that is, the third control signal) for enabling a signal detection and charge pump circuit to be in a disabling state. That is, the control signal 3 may enable the signal detection and charge pump circuit not to work (before the control signal 3 is output, the signal detection and charge pump circuit is in an enabling state). The procedure proceeds to S231. It should be noted that, in the normal working process after the subscriber port of the xDSL subscriber board is initialized, if the signal detection and charge pump circuit is already in the disabling state, the control signal 3 may not be output again repeatedly.

S231: Output the control signal 1 according to the current output power of the subscriber port, so as to control, by using the control signal 1, a power supply voltage provided by the power source module for the line driver corresponding to the subscriber port in the xDSL subscriber board as a minimum undistorted power supply voltage VS+ calculated according to the current output power of the subscriber port.

S240: Output a control signal 3 for enabling the signal detection and charge pump circuit to be in an enabling state. That is, the control signal 3 may enable the signal detection and charge pump circuit to work. The procedure proceeds to S241. It should be noted that, in the normal working process after the subscriber port of the xDSL subscriber board is initialized, if the signal detection and charge pump circuit is already in the enabling state, the control signal 3 may not be output again repeatedly.

S241: Output a control signal 2 (that is, the second control signal) according to the working mode configured on the subscriber port, so as to control a predetermined threshold level in the signal detection and charge pump circuit as a predetermined threshold level corresponding to the working mode configured on the subscriber port. The predetermined threshold level corresponding to the configured working mode may be determined according to a preset corresponding relationship between the working mode and the predetermined threshold level. It should be noted that, in the normal working process after the subscriber port of the xDSL subscriber board is initialized, if the signal detection and charge pump circuit does not undergo enabling/disabling state switching, the control signal 2 may not be output again repeatedly after the control signal 2 is output for the first time.

In the second embodiment, the control signal is generated by using the working mode configured on the subscriber port of the xDSL subscriber board and the current output power of the subscriber port. When the control signal is used to control the minimum undistorted power supply voltage provided for the line driver, the phenomenon of unnecessary energy consumption waste caused by the too high voltage provided for the line driver may be avoided. When the control signal is used to control the predetermined threshold level in the signal detection and charge pump circuit, the phenomenon that the power supply voltage of the line driver unnecessarily follows the waveform of the output signal or cannot follow the waveform of the output signal in time, which is caused by that different working modes correspond to the same predetermined threshold level, may be avoided. When the control signal is used to control the enabling/disabling of the signal detection and charge pump circuit, the phenomenon of unnecessary energy consumption waste of the signal detection and charge pump circuit may be avoided. Therefore, through the second embodiment, the minimum undistorted power supply voltage provided for the line driver, the predetermined threshold level in the signal detection and charge pump circuit, and the enabling/disabling of the signal detection and charge pump circuit can be enabled to match the working mode configured on the subscriber port and the current output power of the subscriber port, thus improving the power output efficiency of the xDSL subscriber board to a greatest degree and eventually reducing the energy consumption of the xDSL subscriber board to a greatest degree through the second embodiment.

A method for improving power output efficiency of a line driver is described in detail in the following through a third embodiment to a fifth embodiment by taking a VDSL2 subscriber board as an example. It should be noted that, the embodiments of the present invention may also be applicable to other xDSL subscriber boards disposed with a signal detection and charge pump circuit and a line driver (for example, a class AB line driver) connected to the signal detection and charge pump circuit.

Embodiment 3: Method for improving power output efficiency of a line driver for a 17a working mode of a subscriber port. A procedure of the method is as shown in FIG. 3.

Figure 3:
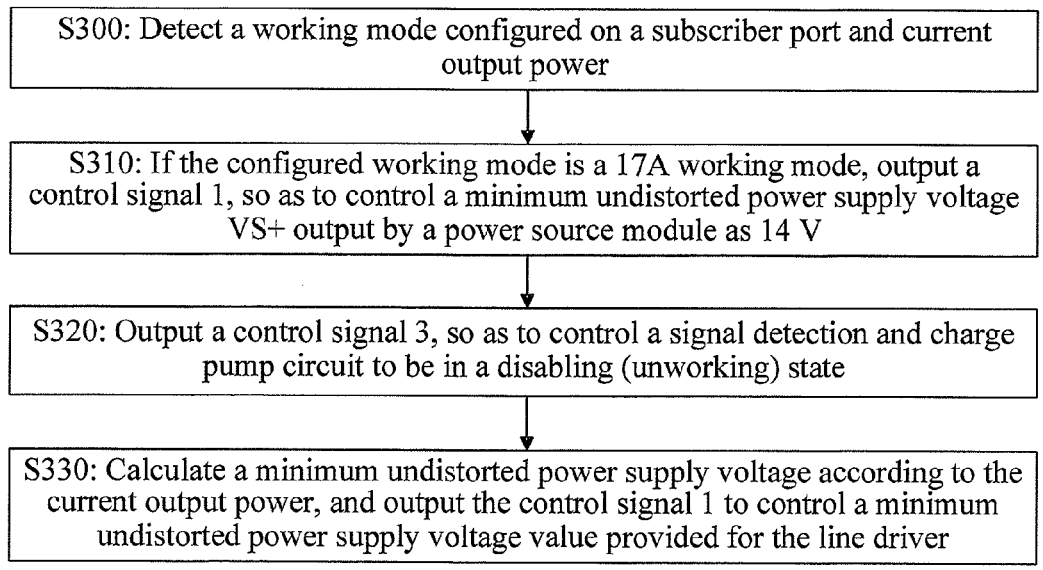
FIG. 3 is a flow chart of a method for improving power output efficiency of a line driver according to a third embodiment of the present invention.

In FIG. 3, S300: Detect a working mode configured on a subscriber port of a VDSL2 subscriber board and current output power of the subscriber port.

S310: After detecting that the working mode configured on the subscriber port of the VDSL2 subscriber board is a 17a working mode, output a control signal 1, so as to control, through the control signal 1, a power supply voltage provided by a power source module for a line driver as a minimum undistorted power supply voltage VS+ (for example, 14 V) corresponding to the 17a working mode.

S320: Output a control signal 3, so as to control, through the control signal 3, a signal detection and charge pump circuit to be in a disabling state (before the control signal 3 is output, the signal detection and charge pump circuit is in an enabling state). It should be noted that, there may be no execution order between S310 and S320. For example, S310 and S320 may be executed in parallel, or S320 may be executed first, and then S310 is executed.

S330: Output the control signal 1 according to the current output power of the subscriber port, so as to control, through the control signal 1, the power supply voltage provided by the power source module for the line driver as a minimum undistorted power supply voltage VS+ calculated and obtained according to the current output power of the subscriber port.

It can be known from the description of the third embodiment that, when the subscriber port in the VDSL2 subscriber board works in the 17a working mode, the signal detection and charge pump circuit needs to be disabled. A reason for disabling the signal detection and charge pump circuit is described in the following with reference to a specific VDSL2 subscriber board shown in FIG. 3A.

Figure 3A:
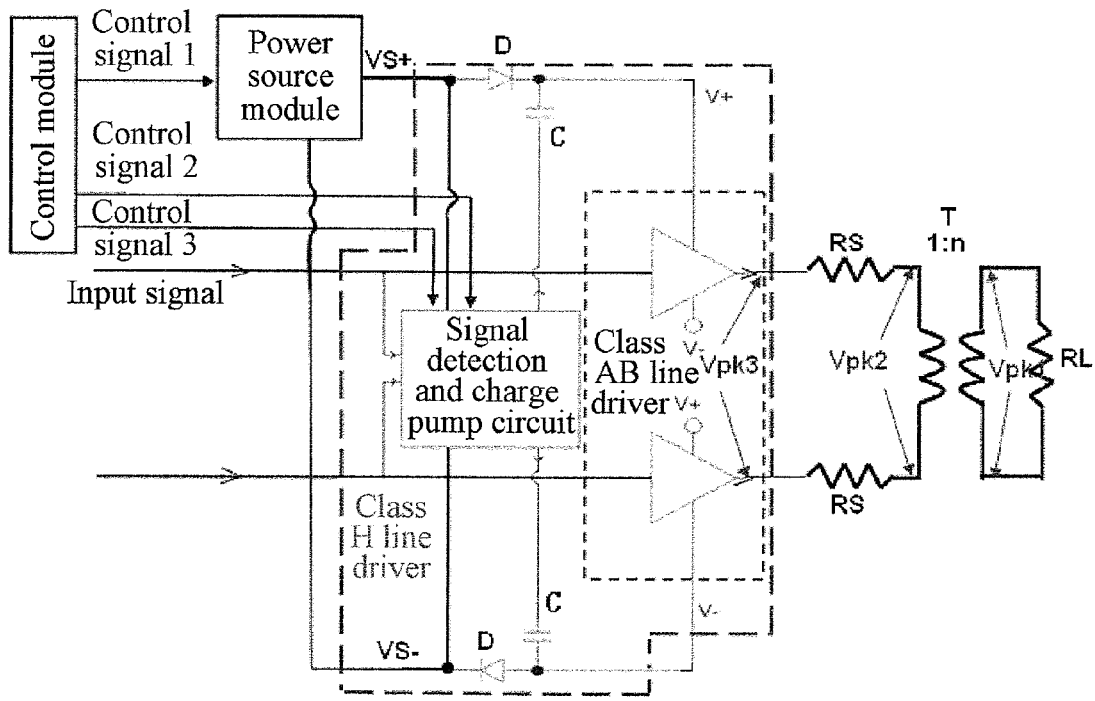
FIG. 3A is a schematic diagram of a specific VDSL2 subscriber board.

The VDSL2 subscriber board shown in FIG. 3A includes a power source module and a class H line driver, where the class H line driver includes a signal detection and charge pump circuit, a class AB line driver, series resistors RS, a transformer T, and a load impedor RL. When the subscriber port of the VDSL2 subscriber board works in the 17a working mode, an output signal of the subscriber port includes the following three characteristics.

Maximum output power characteristic: Maximum output power of the output signal of the subscriber port is usually 14.5 dBm, which is maximum signal power on the load impedor RL.

Voltage peak-to-average ratio characteristic: A voltage peak-to-average ratio of the output signal of the subscriber port is usually high, for example, usually 6.3.

Frequency characteristic: A frequency of the output signal of the subscriber port is high, and may reach, for example, 17 MHz.

The frequency, 17 MHz, of the output signal of the subscriber port is a high frequency, so it is difficult for the signal detection and charge pump circuit to raise a power supply voltage V+ and V− of the class AB line driver in time, that is, it is difficult for the signal detection and charge pump circuit to ensure that V+ and V− are temporally synchronous with an output signal of a large voltage swing, so the signal detection and charge pump circuit cannot satisfy the requirement of the output signal of the large voltage swing on the power supply voltage.

The maximum output power, 14.5 dBm, of the output signal of the subscriber port is not very high, so if the class H line driver is used as the class AB line driver, a power loss value of the class AB line driver is not large. Furthermore, if the class H line driver is still used as a common class H line driver, although the signal detection and charge pump circuit can enable the class AB line driver to work under a lower power supply voltage to reduce the power consumption of the class AB line driver, power consumption increased when the signal detection and charge pump circuit is in a working state may exceed the foregoing reduced power consumption, and eventually, overall power output efficiency of the class H line driver is decreased instead.

Therefore, it can be known that, in the case that the subscriber port of the VDSL2 subscriber board works in the 17a working mode, the signal detection and charge pump circuit is disabled and the class H line driver in the VDSL2 subscriber board is used as the class AB line driver, which is a technical solution that may improve the power output efficiency of the line driver.

It can be known from the description of the third embodiment that, when the subscriber port of the VDSL2 subscriber board works in the 17a working mode, it is required to control, through the control signal 1, the power supply voltage provided by the power source module for the class H line driver as the minimum undistorted power supply voltage VS+ (for example, 14 V) corresponding to the 17a working mode. A process for calculating the minimum undistorted power supply voltage VS+, 14 V, corresponding to the 17a working mode is described in the following with reference to the specific VDSL2 subscriber board shown in FIG. 3A.

It is set that RS=5.1 ohm, RL=100 ohm, a voltage drop of a diode D is 0.4 V, a transformation ratio 1:n of the transformer T is 1:1.4, the voltage peak-to-average ratio (PAR) of the output signal is 6.3, a signal loss rate caused by the transformer T is 5%, the maximum signal power on the load impedor RL is 14.5 dBm, a headroom voltage of the class AB line driver is 1.5V, a fluctuation range of a power source voltage is +/−5%, and VS− is grounded.

In the case of the foregoing setting, the process for calculating the minimum undistorted power supply voltage VS+, 14 V, corresponding to the 17a working mode is as follows.

First, the maximum output power 14.5 dBm of the output signal of the subscriber port in the 17a working mode is converted into power $P_{RL}$ (W) on the load impedor RL:

$$P_{RL(W)} = 10^{\frac{14.5}{10}} \times 0.001 W;$$

$P_{RL}$ (W)≈0.02818 W.

Then, in the case of the power $P_{RL}$ (W) on the load impedor RL, a root-mean-square voltage $V_{RL}$ (RMS) on the load impedor RL is calculated as:

$$V_{RL(RMS)} = \sqrt{P_{RL(W)} \times Z_{Line}};$$

$V_{RL}$ (RMS)≈1.68 Vrms.

Then, in the case of the root-mean-square voltage $V_{RL}$ (RMS) on the load impedor RL, a root-mean-square current IRL (RMS) on the load impedor RL is calculated as:

$$IRL(RMS) = V_{RL}(RMS)/RL = 0.0168 \text{ Arms}.$$

Then, a signal peak voltage Vpk1 on the load impedor RL is calculated as:

$$Vpk1 = V_{RL}(RMS)*PAR = 1.68*6.3 \approx 10.58 \text{ V}.$$

Then, a secondary signal peak voltage Vpk2 on the transformer T is calculated as:

$$Vpk2 = Vpk1*1/n*(1+5\%)/1 = 10.58/1.4*105/100 \approx 7.9 \text{ V}$$

Then, a peak voltage Vpk3 of the output signal of the class AB line driver is calculated as:

$$Vpk3 = Vpk2 + 2*RS*IRL(RMS)*n*PAR \approx 9.4 \text{ V}.$$

The power supply voltage of the class AB line driver is calculated as:

$$(V+-V-)pk- = Vpk3 + (1.5*2) = 9.4 V + (1.5*2) = 12.4 V.$$

Finally, the minimum undistorted power supply voltage provided by the power source module for the signal detection and charge pump circuit is calculated as: (VS+)−(VS−)= (V+−V−) pk+(0.4*2)=13.2 V.

After the fluctuation range, +/−5%, of the power source voltage is taken into account, (VS+)−(VS−) approximately equals 14 V.

Because the VS− is grounded, the minimum undistorted power supply voltage VS+ corresponding to the 17a working mode is 14 V.

Figure 3B:
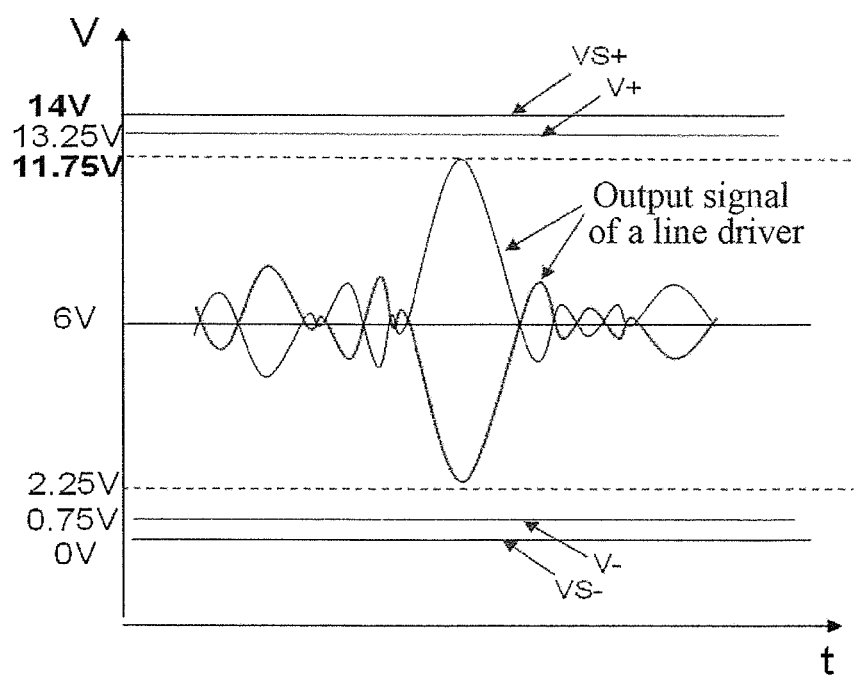
FIG. 3B is a schematic diagram of a relationship between a waveform of an output signal and a power supply voltage according to the third embodiment of the present invention.

When the subscriber port works in the 17a working mode and after the signal detection and charge pump circuit is disabled, a relationship between a waveform of the output signal of the subscriber port and the power supply voltage is as shown in FIG. 3B.

In FIG. 3B, a horizontal coordinate axis represents time t and a vertical coordinate axis represents a voltage V (V). It can be known from the content shown in FIG. 3B that, the minimum undistorted power supply voltage VS+ provided by the power source module for the class H line driver whose signal detection and charge pump circuit is disabled is 14 V, and the 14 V power source voltage can satisfy the requirement of a maximum voltage swing of the signal on the power supply voltage (V+ & V−) when the maximum output power of the subscriber port is 14.5 dBm without voltage raising performed by a charge pump circuit.

In the 17a working mode, a process for calculating the minimum undistorted power supply voltage VS+ provided for the line driver according to the current output power of the subscriber port is as follows. First, output power PRL (dBm) of a current output signal of the subscriber port in the 17a working mode is converted into the power $P_{RL}$ (W) on the load impedor RL:

$$P_{RL(W)} = 10^{\frac{PRL(dBm)}{10}} \times 0.001W.$$

Then, in the case of the power $P_{RL}$ (W) on the load impedor RL, the root-mean-square voltage $V_{RL}$ (RMS) on the load impedor RL is calculated as:

$$V_{RL(RMS)} = \sqrt{P_{RL(W)} \times Z_{Line}}.$$

In the case of the root-mean-square voltage $V_{RL}$ (RMS) on the load impedor RL, the root-mean-square current IRL (RMS) on the load impedor RL is calculated as:

$$IRL(RMS) = V_{RL}(RMS)/RL.$$

Then, the signal peak voltage Vpk1 on the load impedor RL is calculated as:

$$Vpk1 = V_{RL}(RMS)*PAR.$$

Then, the secondary signal peak voltage Vpk2 on the transformer T is calculated as:

$$Vpk2 = Vpk1*1/n*(1+5\%)/1.$$

Then, the peak voltage Vpk3 of the output signal of the class AB line driver is calculated as:

$$Vpk3 = Vpk2+2*RS*IRL(RMS)*n*PAR$$

The power supply voltage of the class AB line driver is calculated as:

$$(V+−V−)pk−=Vpk3+(1.5*2).$$

Finally, the minimum undistorted power supply voltage provided by the power source module for the signal detection and charge pump circuit is calculated as: (VS+)−(VS−)= (V+−V−)pk+(0.4*2).

In the process for calculating the minimum undistorted power supply voltage VS+ provided for the line driver according to the current output power of the subscriber port, the fluctuation range of the power source voltage may also be taken into account.

In the third embodiment, when the subscriber port of the VDSL2 subscriber board works in the 17a working mode, the control signal 1 is used to control the minimum undistorted power supply voltage provided by the power source module for the line driver, and the control signal 3 is used to disable the signal detection and charge pump circuit, so the phenomenon of unnecessary power consumption waste in the 17a working mode is avoided as much as possible. Therefore, through the third embodiment, the power output efficiency of the subscriber port of the VDSL2 subscriber board in the 17a working mode can be improved to a greatest degree, thus obtaining the optimal power output efficiency in the 17a working mode and eventually reducing the energy consumption of the subscriber port of the VDSL2 subscriber board in the 17a working mode to a greatest degree.

Embodiment 4: Method for improving power output efficiency of a line driver for an ADSL2+ working mode. A procedure of the method is as shown in FIG. 4.

Figure 4:
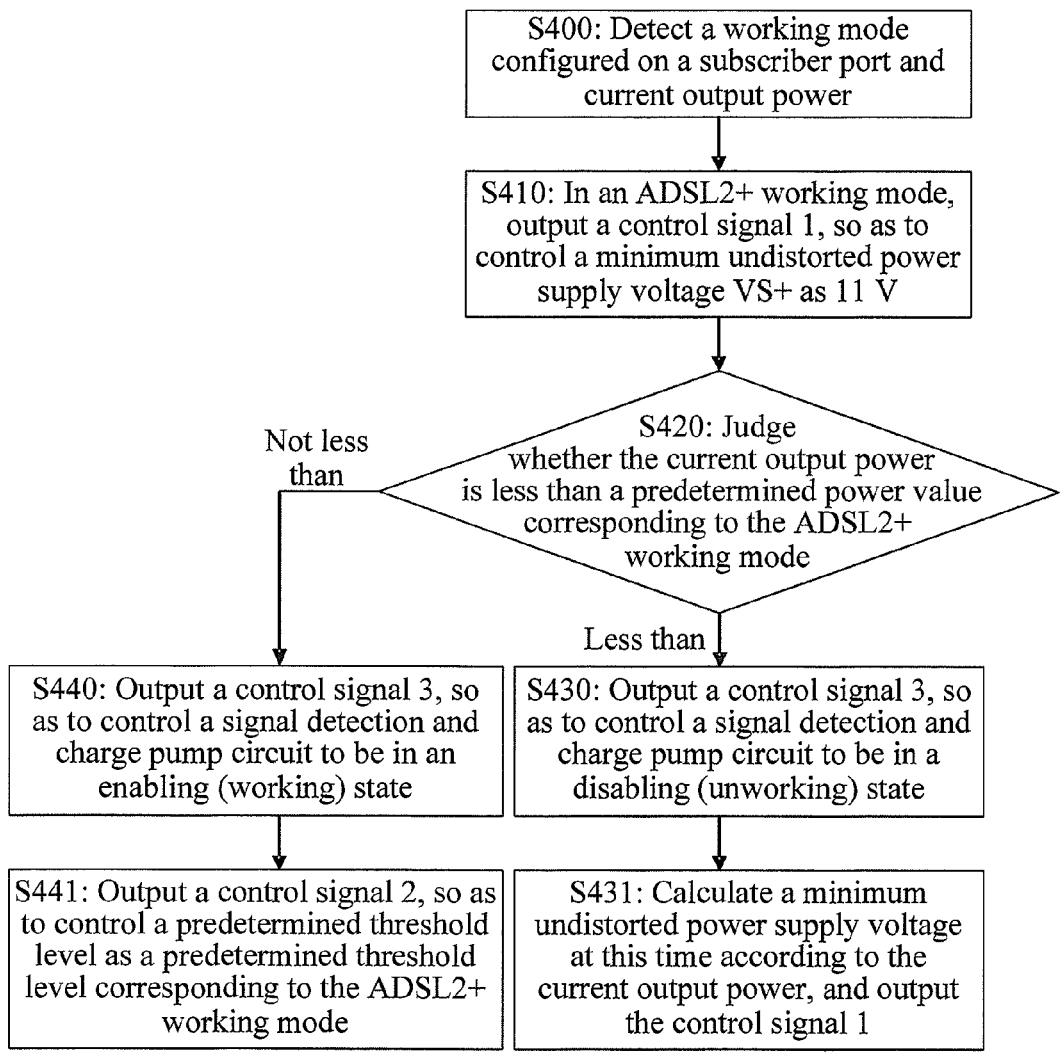
FIG. 4 is a flow chart of a method for improving power output efficiency of a line driver according to a fourth embodiment of the present invention.

In FIG. 4, S400: Detect a working mode configured on a subscriber port of a VDSL2 subscriber board and current output power of the subscriber port.

S410: When it is detected that the working mode configured on the subscriber port of the VDSL2 subscriber board is an ADSL2+ working mode, output a control signal 1, so as to control, through the control signal 1, a power supply voltage provided by a power source module for a class H line driver as a minimum undistorted power supply voltage VS+ (for example, 11 V) corresponding to the ADSL2+ working mode.

S420: Judge whether the current output power of the subscriber port of the VDSL2 subscriber board is less than a predetermined power value corresponding to the ADSL2+ working mode. If the current output power is less than the predetermined power value, the procedure proceeds to S430; if the current output power is not less than the predetermined power value, the procedure proceeds to S440.

S430: Output a control signal 3, so as to control, through the control signal 3, a signal detection and charge pump circuit in the class H line driver to be in a disabling state. The procedure proceeds to S431.

S431: Output the control signal 1 according to the current output power of the subscriber port, so as to control, through the control signal 1, the power supply voltage provided by the power source module for the line driver as a minimum undistorted power supply voltage VS+ corresponding to the current output power of the subscriber port.

S440: Output a control signal 3, so as to control, through the control signal 3, the signal detection and charge pump circuit to be in an enabling state. The procedure proceeds to S441. It should be noted that, if before the control signal 3 is output, the signal detection and charge pump circuit is already in the enabling state, the control signal 3 may not be output.

S441: Output a control signal 2, so as to control, through the control signal 2, a predetermined threshold level in the signal detection and charge pump circuit as a predetermined threshold level corresponding to the ADSL2+ working mode.

It can be known from the description of the fourth embodiment that, when the subscriber port of the VDSL2 subscriber board works in the ADSL2+ working mode, in the case that the current output power of the subscriber port is less than the predetermined power value corresponding to the ADSL2+ working mode, the signal detection and charge pump circuit may be enabled to be in an unworking state, and in the case that the current output power is not less than the predetermined power value corresponding to the ADSL2+ working mode, the signal detection and charge pump circuit can be enabled to be in a working state. A reason for enabling/ disabling the signal detection and charge pump circuit in the ADSL2+ working mode is described in the following with reference to the specific VDSL2 subscriber board shown in FIG. 3A.

When the subscriber port of the VDSL2 subscriber board shown in FIG. 3A works in the ADSL2+ working mode, an output signal of the subscriber port includes the following characteristics.

Maximum output power characteristic: Maximum output power of the output signal of the subscriber port is usually 19.8 dBm, which is maximum signal power on the load impedor RL.

Voltage peak-to-average ratio characteristic: A voltage peak-to-average ratio of the output signal of the subscriber port is usually 5.5, which is less than the voltage peak-to-average ratio in the 17a working mode.

Frequency characteristic: A frequency of the output signal of the subscriber port is usually low, and only reaches, for example, 2.2 MHz, which is lower than the frequency in the 17a working mode.

The frequency, 2.2 MHz, of the output signal of the subscriber port is a low frequency, so the signal detection and charge pump circuit can raise a power supply voltage V+ and V− of a class AB line driver in time, that is, the signal detection and charge pump circuit can ensure that V+ and V− are temporally synchronous with an output signal of a large voltage swing, so the signal detection and charge pump circuit can satisfy the requirement of the output signal of the large voltage swing on the power supply voltage.

The maximum output power, 19.8 dBm, of the output signal of the subscriber port is high, so if the class H line driver is used in a common class H line driver mode when the current output power is high (greater than the predetermined power value corresponding to the ADSL2+ working mode), a power loss value of the class AB line driver, where the power loss value of the class AB line driver is reduced by the signal detection and charge pump circuit through reducing the minimum undistorted power supply voltage VS+, is greater than energy consumption consumed when the signal detection and charge pump circuit is in the working state. However, if the class H line driver is used as the class AB line driver when the current output power is low, a power loss value of the class AB line driver is not large. Moreover, if the class H line driver is still used as the class H line driver when the current output power is low, although the signal detection and charge pump circuit can enable the class AB line driver to work in a lower power supply voltage to reduce the power consumption of the class AB line driver, power consumption increased when the signal detection and charge pump circuit is in the working state may exceed the reduced power consumption, thus eventually decreasing overall power output efficiency of the class H line driver instead.

Therefore, it can be known that, in the case that the subscriber port of the VDSL2 subscriber board works in the ADSL2+ working mode, when the subscriber port outputs a large power signal, the signal detection and charge pump circuit is controlled to be in the working state (that is, the class H line driver mode is applied); however, when the subscriber port outputs a small power signal, the signal detection and charge pump circuit is controlled to be in the unworking state (that is, the class AB line driver mode is applied), which is a technical solution that may improve the power output efficiency of the line driver.

It can be known from the description of the fourth embodiment that, when the subscriber port of the VDSL2 subscriber board works in the ADSL2+ working mode, it is required to control, through the control signal 1, the voltage provided by the power source module for the class H line driver as the minimum undistorted power supply voltage VS+ (for example, 11V) corresponding to the 1ADSL2+ working mode. A process for calculating the minimum undistorted power supply voltage VS+, 11 V, corresponding to the ADSL2+ working mode is described in brief in the following with reference to the specific VDSL2 subscriber board shown in FIG. 3A.

It is set that RS=5.1 ohm, RL=100 ohm, a voltage drop of a diode D is 0.4 V, a transformation ratio 1:n of a transformer T is 1:1.4, the voltage peak-to-average ratio of the output signal is 5.5, a signal loss rate caused by the transformer T is 5%, maximum signal power on a load impedor RL is 19.8 dBm, a headroom voltage of the class AB line driver is 1.5V, a fluctuation range of a power source voltage is +/−5%, and VS− is grounded.

In the case of the foregoing setting, the process for calculating the minimum undistorted power supply voltage VS+, 11 V, corresponding to the ADSL2+ working mode is basically the same as the process for calculating the minimum undistorted power supply voltage VS+, 11 V, corresponding to the 17a working mode in the third embodiment and is not described here in detail again.

The minimum undistorted power supply voltage (VS+)− (VS−) that corresponds to the ADSL2+ working mode and is calculated by using the formulas recorded in the third embodiment may be 10.025 V. After the fluctuation range, +/−5%, of the power source voltage is taken into account, the minimum undistorted power supply voltage (VS+)−(VS−) corresponding to the ADSL2+ working mode may be 10.5 V. In an actual application, with voltage accuracy provided by the power source module being taken into account, (VS+)− (VS−) may be set to 11 V. Because the VS− is grounded, the minimum undistorted power supply voltage VS+ corresponding to the ADSL2+ working mode is 11 V.

Figure 4A:
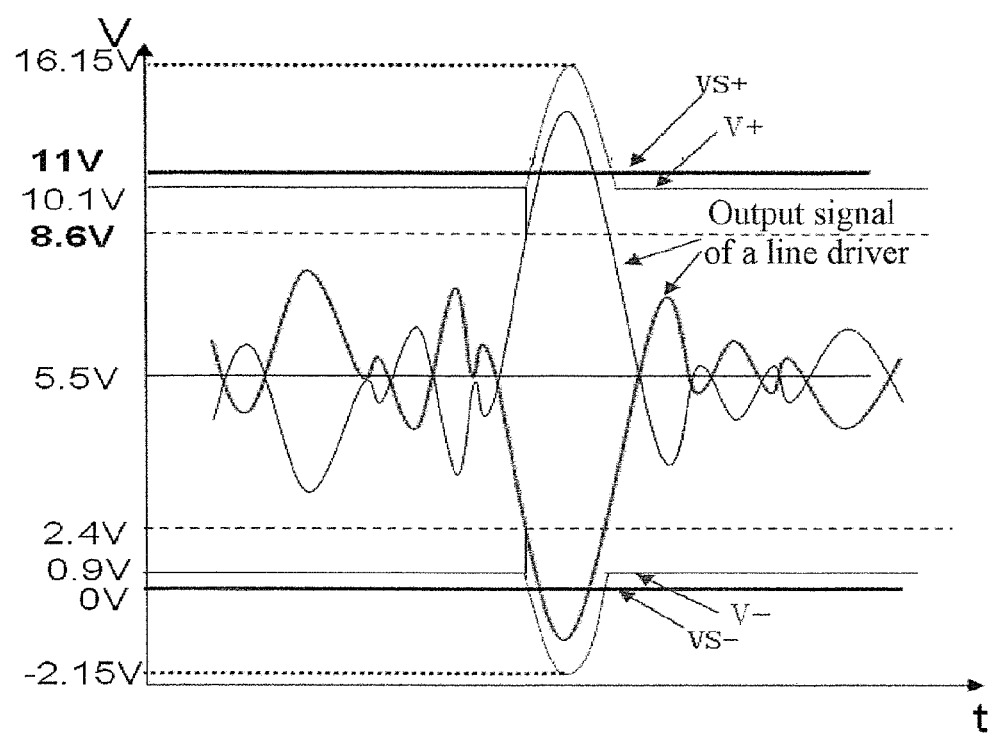
FIG. 4A is a schematic diagram of a relationship between a waveform of an output signal and a power supply voltage according to the fourth embodiment of the present invention.

When the subscriber port works in the ADSL2+ working mode, a relationship between a waveform of the output signal of the subscriber port and the power supply voltage is as shown in FIG. 4A.

In FIG. 4A, a horizontal coordinate axis represents time t and a vertical coordinate axis represents a voltage V (V). It can be known from the content shown in FIG. 4A that, when the minimum undistorted power supply voltage VS+ provided by the power source module for the class H line driver is 11 V, after the power supply voltage V+ and V− of the class AB line driver is raised by a charge pump circuit, the requirement of a maximum voltage swing of the output signal on the power supply voltage can be satisfied when the maximum output power of the subscriber port in the ADSL2+ working mode is 19.8 dBm.

It can also be known from the content shown in FIG. 4A that, when a positive voltage swing of the output signal of the subscriber port is greater than 8.6 V, the charge pump circuit raises the power supply voltage V+ and V− of the class AB line driver, so that the power supply voltage of the class AB line driver follows a voltage waveform of the output signal of the subscriber port. If a gain of the class H line driver is 10 V/V, the predetermined threshold level corresponding to the ADSL2+ working mode in a signal detection circuit may be 0.86 V. That is to say, in the ADSL2+ working mode, when a positive voltage swing of an input signal is greater than the predetermined threshold level 0.86V, an input signal with an exceeding voltage swing may be captured for rail-to-rail voltage amplification, and then the charge pump circuit superimposes the amplified waveform voltage onto the power supply voltage of the class AB line driver, so that a power supply voltage can follow the voltage waveform of the output signal of the subscriber port and is synchronous with the voltage waveform of the output signal of the subscriber port. It is the same for a negative voltage swing of the output signal.

It can also be known from the content shown in FIG. 4A that, in the case of the ADSL2+ working mode and the minimum undistorted power supply voltage being 11 V, when the current output power of the subscriber port is less than a predetermined power value corresponding to the ADSL2+ working mode, without raising of the power supply voltage V+ and V− of the class AB line driver by the charge pump circuit, the requirement of the maximum voltage swing of the signal on the power supply voltage V+ and V− under the current output power may be satisfied, so the signal detection and charge pump circuit may be in a disabling (that is, unworking) state. When the signal detection and charge pump circuit is in the disabling state, the control signal 1 is output according to the current output power of the subscriber port to adjust the minimum undistorted power supply voltage VS+ provided by the power source module, so that the minimum undistorted power supply voltage VS+ provided by the voltage module can just satisfy the requirement of the maximum voltage swing of the signal on the power supply voltage V+ and V− under the current output power, thus avoiding unnecessary energy consumption.

A process for calculating the predetermined power value corresponding to the ADSL2+ working mode may be as follows.

In the ADSL2+ working mode, when the minimum undistorted power supply voltage provided by the power source module for the signal detection and charge pump circuit is 11 V, with the power source voltage fluctuation of 5% being taken into account, the power supply voltage of the signal detection and charge pump circuit is about 10.5 V, that is, (VS+)−(VS−)=10.5 V. At this time, the power supply voltage of the class AB line driver is about 9.7 V, that is, (V+−V−)=(VS+)−(VS−)−(0.4*2)=9.7 V.

When the signal detection and charge pump circuit is disabled and the power supply voltage is 9.7 V, a maximum voltage swing Vpk3 of an undistorted signal that can be output by the class AB line driver is:

$$Vpk3=[(VS+)-(VS-)]-1.5*2=6.7\,V.$$

At this time, a maximum voltage swing Vpk2 of a secondary signal of the transformer T is:

$$Vpk2=Vpk3*[(RL/n^2)/(RL/n^2+RS*2)]=5.584\,V.$$

At this time, a maximum voltage swing Vpk1 of a primary signal of the transformer T is:

$$Vpk1=Vpk2*n*(100\%-5\%)=(5.584*1.4)*(100\%-5\%)=7.43\,V.$$

An average voltage VRL(rms) on the load impedor RL is $$VRL(\text{rms})=Vpk1/PAR=7.82\,V/5.5=1.35\,V.$$

Signal power on the load impedor RL is $$PRL(W)=VRL(\text{rms})^2/RL=0.018\,W.$$

The signal power on the load impedor RL is converted into dBm, and PRL(dBm) is:

$$PRL(\text{dBm})=10\,\log(PRL(w)*1000)=13\,\text{dBm}.$$

The 13 dBm obtained through calculation is the predetermined power value corresponding to the ADSL2+ working mode.

In the fourth embodiment, when the subscriber port of the VDSL2 subscriber board works in the ADSL2+ working mode, the control signal 1 is used to control the minimum undistorted power supply voltage of the line driver, the control signal 2 is used to control the predetermined threshold level in the signal detection and charge pump circuit, and the control signal 3 is used to control the enabling/disabling of the signal detection and charge pump circuit, so the phenomenon of unnecessary energy consumption waste in the ADSL2+ working mode is avoided as much as possible. Therefore, through the fourth embodiment, the power output efficiency of the subscriber port of the VDSL2 subscriber board in the ADSL2+ working mode can be improved to a greatest degree, thus obtaining the optimal power output efficiency in the ADSL2+ working mode and eventually reducing the energy consumption of the subscriber port of the VDSL2 subscriber board in the ADSL2+ working mode.

Embodiment 5: Method for improving power output efficiency of a line driver for an 8b working mode. A procedure of the method is as shown in FIG. 5.

Figure 5:
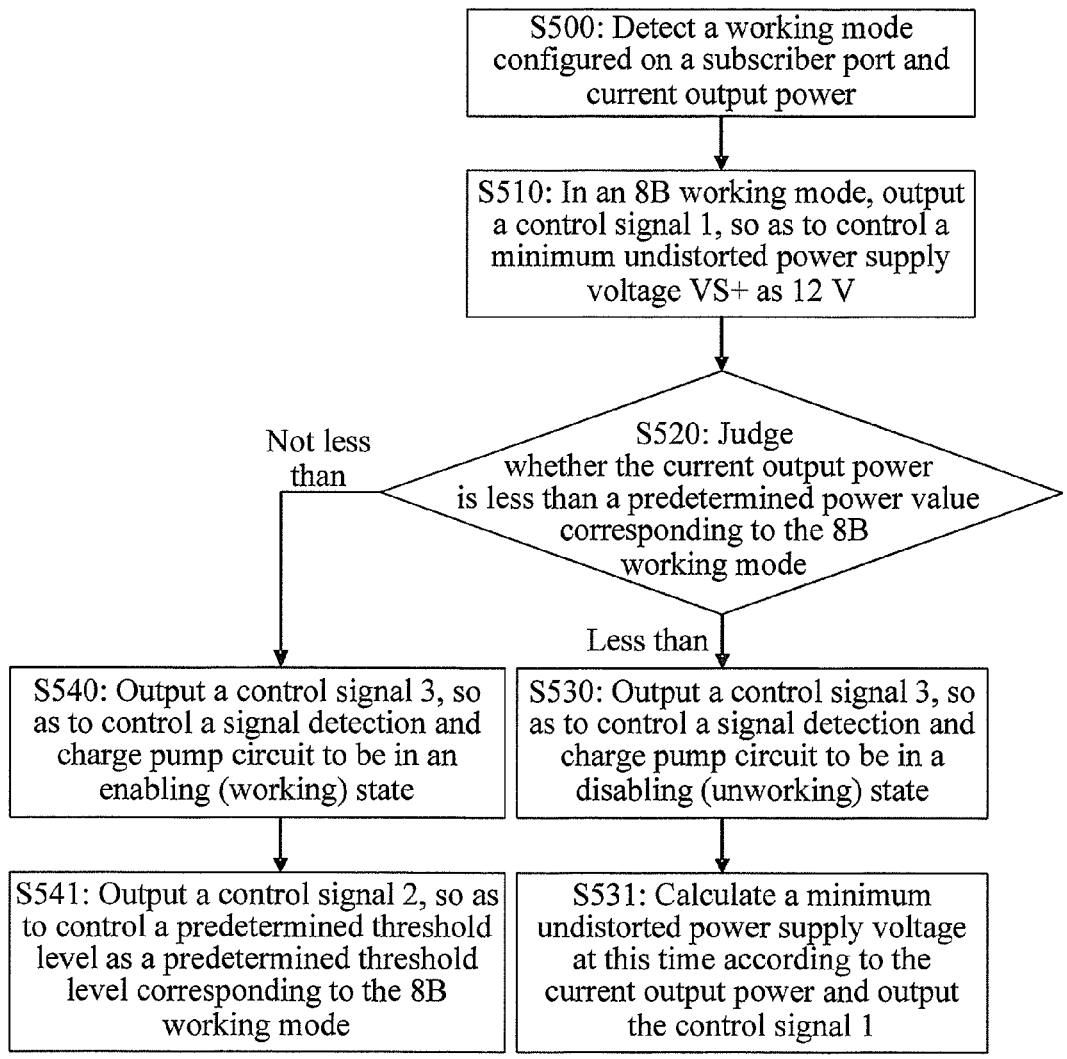
FIG. 5 is a flow chart of a method for improving power output efficiency of a line driver according to a fifth embodiment of the present invention.

In FIG. 5, S500: Detect a working mode configured on a subscriber port of a VDSL2 subscriber board and current output power of the subscriber port.

S510: After detecting that the working mode configured on the subscriber port of the VDSL2 subscriber board is an 8b working mode, output a control signal 1, so as to control, through the control signal 1, a voltage provided by a power source module for a class H line driver as a minimum undistorted power supply voltage VS+ (for example, 12 V) corresponding to the 8b working mode.

S520: Judge whether the current output power of the subscriber port of the VDSL2 subscriber board is less than a predetermined power value corresponding to the 8b working mode. If the current output power is less than the predetermined power value, the procedure proceeds to S530; if the current output power is not less than the predetermined power value, the procedure proceeds to S540.

S530: Output a control signal 3, so as to control, through the control signal 3, a signal detection and charge pump circuit to be in a disabling state. The procedure proceeds to S531.

S531: Output the control signal 1 according to the current output power of the subscriber port, so as to control, through the control signal 1, a power supply voltage provided by the power source module for the class H line driver as a minimum undistorted power supply voltage VS+ corresponding to the current output power of the subscriber port.

S540: Output a control signal 3, so as to control, through the control signal 3, the signal detection and charge pump circuit to be in an enabling state. The procedure proceeds to S541. It should be noted that, if before the control signal 3 is output, the signal detection and charge pump circuit is already in the enabling state, the control signal 3 may not be output.

S541: Output a control signal 2, so as to control, through the control signal 2, a predetermined threshold level in the signal detection and charge pump circuit as a predetermined threshold level corresponding to the 8b working mode.

It can be known from the description of the fifth embodiment that, when the subscriber port of the VDSL2 subscriber board works in the 8b working mode, in the case that the current output power is less than the predetermined power value corresponding to the 8b working mode, the signal detection and charge pump circuit may be enabled to be in an unworking state, and in the case that the current output power is not less than the predetermined power value corresponding to the 8b working mode, the signal detection and charge pump circuit can be enabled to be in a working state. A reason for enabling/disabling the signal detection and charge pump circuit in the 8b working mode is described in the following with reference to the specific VDSL2 subscriber board shown in FIG. 3A.

When the subscriber port of the VDSL2 subscriber board shown in FIG. 3A works in the 8b working mode, an output signal of the subscriber port includes the following characteristics.

Maximum output power characteristic: Maximum output power of the output signal of the subscriber port is usually 20.4 dBm, which is maximum signal power on the load impedor RL.

Voltage peak-to-average ratio characteristic: A voltage peak-to-average ratio of the output signal of the subscriber port is usually 6.3, which is equal to the voltage peak-to-average ratio in the 17a working mode.

Frequency characteristic: A frequency of the output signal of the subscriber port is usually low, for example, 8 MHz, which is lower than the frequency in the 17a working mode.

The frequency, 8 MHz, of the output signal of the subscriber port is a low frequency, so the signal detection and charge pump circuit can raise a power supply voltage V+ and V− of a class AB line driver in time, that is, the signal detection and charge pump circuit can ensure that V+ and V− are temporally synchronous with an output signal of a large voltage swing, so the signal detection and charge pump circuit can satisfy the requirement of the output signal of the large voltage swing on the power supply voltage.

The maximum output power, 20.4 dBm, of the output signal of the subscriber port is high, so if the class H line driver is used in a class H line driver mode when the current output power is high (greater than the predetermined power value corresponding to the 8b working mode), a power consumption loss value of the class AB line driver, where the power consumption loss value of the class AB line driver is reduced by the signal detection and charge pump circuit through reducing the minimum undistorted power supply voltage VS+, is greater than power consumed when the signal detection and charge pump circuit is in the working state. However, if the class H line driver is used as the class AB line driver when the current output power is low, a power loss value of the class AB line driver is not large. Moreover, if the class H line driver is still used as the class H line driver when the current output power is low, although the signal detection and charge pump circuit can enable the class AB line driver to work in a lower power supply voltage to reduce the power consumption of the class AB line driver, power consumption increased when the signal detection and charge pump circuit is in the working state may exceed the reduced power consumption, thus eventually decreasing overall power output efficiency of the class H line driver instead.

Therefore, it can be known that, in the case that the subscriber port of the VDSL2 subscriber board works in the 8b working mode, when the subscriber port outputs a large power signal, the signal detection and charge pump circuit is controlled to be in the working state (that is, the class H line driver mode is applied); however, when the subscriber port outputs a small power signal, the signal detection and charge pump circuit is controlled to be in the unworking state (that is, the class AB line driver mode is applied), which is a technical solution that may improve the power output efficiency of the line driver.

It can be known from the description of the fifth embodiment that, when the subscriber port of the VDSL2 subscriber board works in the 8b working mode, it is required to control, through the control signal 1, the voltage provided by the power source module for the signal detection and charge pump circuit as the minimum undistorted power supply voltage VS+ (for example, 12 V) corresponding to the 8b working mode. A process for calculating the minimum undistorted power supply voltage VS+, 12 V, corresponding to the 8b working mode is described in brief in the following with reference to the specific VDSL2 subscriber board shown in FIG. 3A.

It is set that RS=5.1 ohm, RL=100 ohm, a voltage drop of a diode D is 0.4 V, a transformation ratio 1:n of a transformer T is 1:1.4, the voltage peak-to-average ratio of the output signal is 6.3, a transformation loss rate is 5% (that is, a signal loss rate caused by the transformer T is 5%, maximum signal power on a load impedor RL is 20.4 dBm, a headroom voltage of the class AB line driver is 1.5 V, a fluctuation range of a power source voltage is +/−5%, and VS− is grounded.

In the case of the foregoing setting, the process for calculating the minimum undistorted power supply voltage VS+, 12 V, corresponding to the 8b working mode is basically the same as the process for calculating the minimum undistorted power supply voltage VS+, 11 V, corresponding to the 17a working mode in the third embodiment and is not described here in detail again.

The minimum undistorted power supply voltage that corresponds to the 8b working mode and is calculated by using the formulas recorded in the third embodiment is (VS+)−(VS−)=(18.3+(0.4*2))/2=22.57/2 V, that is, 11.285 V. After the fluctuation range, +/−5%, of the power source voltage being taken into account, the minimum undistorted power supply voltage corresponding to the 8b working mode may be about 11.85 V. In an actual application, with voltage accuracy provided by the power source module being taken into account, (VS+)−(VS−) may be set to 12 V. Because the VS− is grounded, the minimum undistorted power supply voltage VS+ corresponding to the ADSL2+ working mode is 12 V.

Figure 5A:
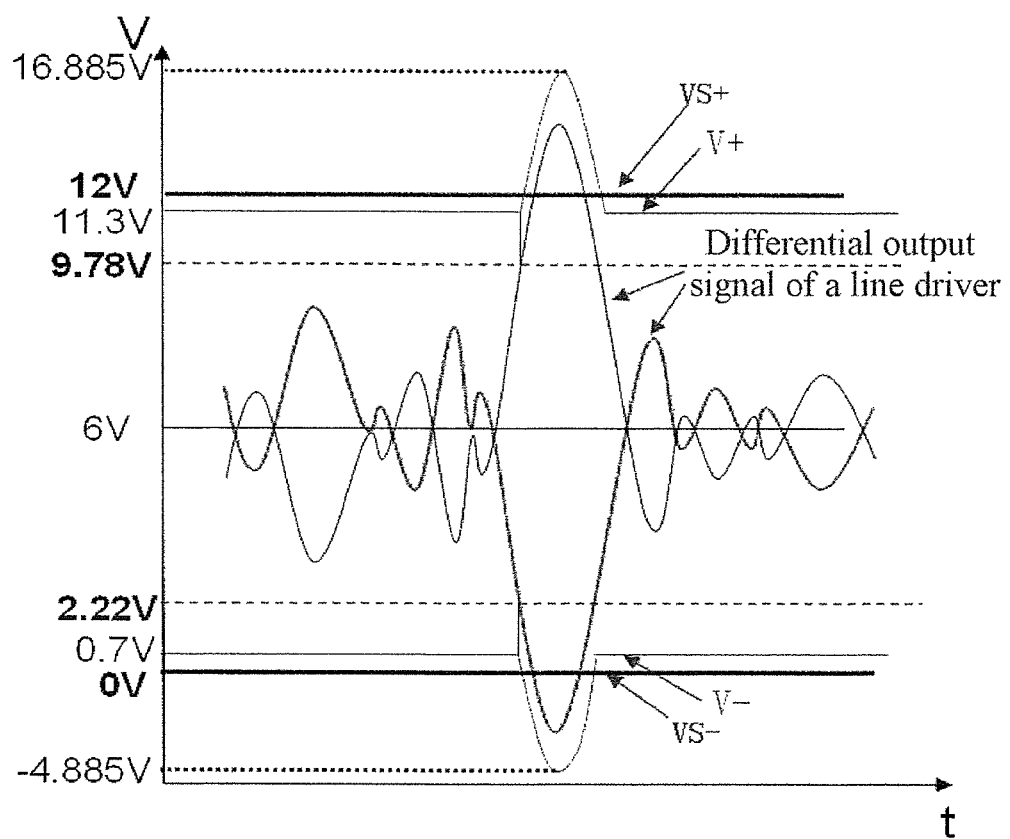
FIG. 5A is a schematic diagram of a relationship between a waveform of an output signal and a power supply voltage according to the fifth embodiment of the present invention.

When the subscriber port works in the 8b working mode, a relationship between a waveform of the output signal of the subscriber port and the power supply voltage is as shown in FIG. 5A.

In FIG. 5A, a horizontal coordinate axis represents time t and a vertical coordinate axis represents a voltage V (V). It can be known from the content shown in FIG. 5A that, when the minimum undistorted power supply voltage VS+ provided by the power source module for the class H line driver is 12 V, after the power supply voltage V+ and V− of the class AB line driver is raised by a charge pump circuit, the requirement of a maximum voltage swing of the output signal on the power supply voltage can be satisfied when the maximum output power of the subscriber port in the 8b working mode is 20.4 dBm.

It can also be known from the content shown in FIG. 5A that, when a positive voltage swing of the output signal of the subscriber port is greater than 9.78 V, the charge pump circuit raises the power supply voltage V+ and V− of the class AB line driver, so that the power supply voltage of the class AB line driver follows a voltage waveform of the output signal of the subscriber port. If a gain of the class H line driver is 10 V/V, the predetermined threshold level corresponding to the 8b working mode in a signal detection circuit may be 0.978 V. That is to say, in the 8b working mode, when a positive voltage swing of an input signal is greater than the predetermined threshold level 0.978 V, an input signal with an exceeding voltage swing may be captured for rail-to-rail voltage amplification, and then the charge pump circuit superimposes the amplified waveform voltage onto the power supply voltage of the class AB line driver, so that a power supply voltage waveform of the class AB line driver can follow the voltage waveform of the output signal of the subscriber port and is synchronous with the voltage waveform of the output signal of the subscriber port. It is the same for a negative voltage swing of the output signal.

It can also be known from the content shown in FIG. 5A that, in the case of the 8b working mode and the minimum undistorted power supply voltage being 12V, when the current output power of the subscriber port is less than a predetermined power value corresponding to the 8b working mode, without raising of the power supply voltage V+ and V− of the class AB line driver by the charge pump circuit, the requirement of the maximum voltage swing of the signal on the power supply voltage V+ and V− under the current output power may be satisfied, so the signal detection and charge pump circuit may be in a disabling (that is, unworking) state. When the signal detection and charge pump circuit is in the disabling state, the control signal 1 is output according to the current output power of the subscriber port to adjust the minimum undistorted power supply voltage VS+ of the line driver provided by the power source module, so that the minimum undistorted power supply voltage VS+ provided by the voltage module can just satisfy the requirement of the maximum voltage swing of the signal on the power supply voltage V+ and V− under the current output power, thus avoiding unnecessary energy consumption.

In the fifth embodiment, the process for calculating the predetermined power value corresponding to the 8b working mode is basically the same as the process for calculating the predetermined power value corresponding to the ADSL2+ working mode in the fourth embodiment and is not described here in detail again.

In the fifth embodiment, when the subscriber port of the VDSL2 subscriber board works in the 8b working mode, the control signal 1 is used to control the minimum undistorted power supply voltage provided for the line driver, the control signal 2 is used to control the predetermined threshold level in the signal detection and charge pump circuit, and the control signal 3 is used to control the enabling/disabling of the signal detection and charge pump circuit, so the phenomenon of unnecessary energy consumption waste in the 8b working mode is avoided as much as possible. Therefore, through the fifth embodiment, the power output efficiency of the subscriber port of the VDSL2 subscriber board in the 8b working mode can be improved to a greatest degree, thus obtaining the optimal power output efficiency in the 8b working mode and eventually reducing the energy consumption of the subscriber port of the VDSL2 subscriber board in the 8b working mode.

Embodiment 6: Apparatus for improving power output efficiency of a line driver. A structure of the apparatus is as shown in FIG. 6.

Figure 6:
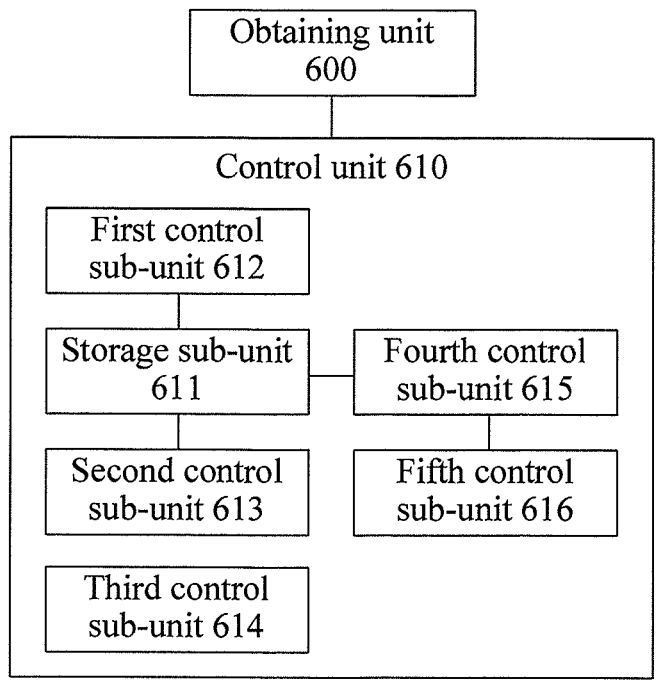
FIG. 6 is a schematic diagram of an apparatus for improving power output efficiency of a line driver according to a sixth embodiment of the present invention.

The apparatus in FIG. 6 includes an obtaining unit 600 and a control unit 610.

The obtaining unit 600 is configured to obtain a current working parameter of an xDSL subscriber board, where the current working parameter includes at least one of a working mode configured on a subscriber port of the xDSL subscriber board and current output power of the subscriber port.

The obtaining unit 600 may obtain the working mode configured on the subscriber port before the subscriber port of the xDSL subscriber board is initialized. If the xDSL subscriber board may change the working mode configured on the subscriber port in a working process and the changed configured working mode may be successfully activated in a normal working process of the subscriber port, the obtaining unit 600 may obtain the working mode configured on the subscriber port at regular time. The obtaining unit 600 may obtain the current output power of the subscriber port in the initialization process of the subscriber port, or obtain the current output power of the subscriber port in real time in the normal working process of the subscriber port. The obtaining unit 600 may obtain the current output power of the subscriber port by detecting an actual output of the subscriber port, or obtain the current output power of the subscriber port through calculation according to the size of an input signal.

The control unit 610 is configured to determine, according to the current working parameter obtained by the obtaining unit 600, a control signal for a line driver in the xDSL subscriber board, and output the control signal. Here, the control signal includes at least one of a first control signal, a second control signal, and a third control signal. The first control signal is used to control a minimum undistorted power supply voltage provided for the line driver, where the minimum undistorted power supply voltage may act on a line driver (for example, a class AB line driver) connected to a signal detection and charge pump circuit through the signal detection and charge pump circuit. That is to say, the first control signal controls a power source module for providing a voltage for the line driver, so that the power source module provides a corresponding power supply voltage for the line driver according to the first control signal. The second control signal is used to control a predetermined threshold level in the signal detection and charge pump circuit, where the predetermined threshold level is a threshold value for enabling the power supply voltage of the line driver to follow a waveform of an output signal. The third control signal is used to control enabling/disabling of the signal detection and charge pump circuit, that is, the third control signal controls whether the signal detection and charge pump circuit needs to work.

A principle for the control unit 610 to determine the control signal for the signal detection and charge pump circuit in the xDSL subscriber board according to the current working parameter obtained by the obtaining unit 600 may be: The control signal matches the current working parameter. That is, the control unit 610 may output the first control signal according to a principle that the minimum undistorted power supply voltage provided for the line driver matches the working mode configured on the subscriber port, the control unit 610 may output the first control signal according to a principle that the power supply voltage provided for the line driver matches the current output power of the subscriber port, the control unit 610 may output the second control signal according to a principle that the predetermined threshold level in the signal detection and charge pump circuit matches the working mode configured on the subscriber port, and the control unit 610 may output the third control signal according to a principle that an enabling/disabling state of the signal detection and charge pump circuit matches the working mode configured on the subscriber port. In this way, the control unit 610 enables the control signal to match the current working parameter of the xDSL subscriber board, thus reducing unnecessary energy consumption of the xDSL subscriber board. Here, the unnecessary energy consumption may be incurred by unnecessary work of the signal detection and charge pump circuit, or by providing a voltage which is higher than that required by the current output power for the line driver, or by unnecessarily enabling, by the signal detection and charge pump circuit and according to the predetermined threshold level, the power supply voltage of the line driver to follow the waveform of the output signal.

A first group of sub-units included in the control unit 610 may be: a storage sub-unit 611 and a first control sub-unit 612.

The storage sub-unit 611 is configured to store a corresponding relationship between the working mode of the subscriber port and the minimum undistorted power supply voltage provided for the line driver. The minimum undistorted power supply voltage provided for the line driver in the corresponding relationship is preset for a signal characteristic on the subscriber port in the working mode. Here, the signal characteristic is, such as, maximum output power, a voltage peak-to-average ratio of the output signal, a voltage drop value of a diode, a headroom voltage of the class AB line driver connected to the signal detection and charge pump circuit, or voltage fluctuation that are on the subscriber port in a working mode. A specific manner for setting the minimum undistorted power supply voltage in the corresponding relationship is illustrated in the third embodiment with reference to the specific circuit.

The first control sub-unit 612 is configured to, in the initialization process of the subscriber port of the xDSL subscriber board, determine, according to the corresponding relationship stored in the storage sub-unit 611, a minimum undistorted power supply voltage corresponding to the working mode configured on the subscriber port, and output the first control signal according to the minimum undistorted power supply voltage corresponding to the configured working mode, so as to control the power supply voltage provided by the power source module for the line driver as the minimum undistorted power supply voltage corresponding to the configured working mode.

A second group of sub-units included in the control unit 610 may be: a storage sub-unit 611 and a second control sub-unit 613.

The storage sub-unit 611 is configured to store a corresponding relationship between the working mode of the subscriber port and the predetermined threshold level in the signal detection and charge pump circuit. Here, the predetermined threshold level may be a starting voltage for the signal detection and charge pump circuit to raise the power supply voltage of the class AB line driver.

The second control sub-unit 613 is configured to determine, according to the corresponding relationship stored in the storage sub-unit 611, a predetermined threshold level corresponding to the working mode configured on the subscriber port, and output the second control signal according to the predetermined threshold level corresponding to the configured working mode, so as to control the predetermined threshold level in the signal detection and charge pump circuit as the predetermined threshold level corresponding to the configured working mode.

A third group of sub-units included in the control unit 610 may be: a third control sub-unit 614.

The third control sub-unit 614 is configured to: when the working mode configured on the subscriber port is a first mode, output the third control signal for disabling the signal detection and charge pump circuit to control the signal detection and charge pump circuit to be in a work stopping state. The first mode is a working mode in which a frequency of the output signal of the subscriber port is high and maximum output power of the output signal is low, for example, a 17a working mode. Here, the high frequency and the low power may be measured according to whether the frequency is higher than a frequency threshold and whether the power is lower than a power threshold. Values of the frequency threshold and the power threshold may be set according to the actual application situation of the xDSL subscriber board. For example, the frequency threshold may be set according to voltage raising performance of the signal detection and charge pump circuit in the xDSL subscriber board, and the power threshold may be set according to a minimum undistorted voltage provided for the line driver in the xDSL subscriber board, so that the power consumption of the signal detection and charge pump circuit is not greater than power consumption saving of the class AB line driver. A specific example of setting the frequency threshold is recorded in the first embodiment and is not described here again.

A fourth group of sub-units included in the control unit 610 may be: a storage sub-unit 611 and a fourth control sub-unit 615.

The storage sub-unit 611 is configured to store a corresponding relationship between the working mode of the subscriber port and the predetermined power value.

The fourth control sub-unit 615 is configured to: when the working mode configured on the subscriber port is a second mode and it is determined, according to the corresponding relationship stored in the storage sub-unit 611, that the current output power is less than a predetermined power value corresponding to the second mode, output the third control signal for disabling the signal detection and charge pump circuit to control the signal detection and charge pump circuit to be in the work stopping state. Here, "less than" may also be changed to "less than or equal to". The second mode is a working mode in which the frequency of the output signal of the subscriber port is low and the maximum output power of the output signal is high, for example, an ADSL2+ working mode or an 8b working mode. Here, the low frequency and the high power may be measured according to whether the frequency is lower than a frequency threshold and whether the power is higher than a power threshold. Values of the frequency threshold and the power threshold may be set according to an actual application situation of the xDSL subscriber board, as specifically described in the first embodiment. Details are not described here again. Furthermore, the second mode includes at least one working mode. When the second mode includes multiple types of working modes, the storage sub-unit 611 stores predetermined power corresponding to each type of working mode included in the second mode, and each type of working mode may correspond to a different predetermined power value.

The fourth control sub-unit 615 is further configured to: when the working mode configured on the subscriber port is the second mode and the current output power of the subscriber port is not less than the predetermined power value corresponding to the second mode, output the third control signal for enabling the signal detection and charge pump circuit to control the signal detection and charge pump circuit to be in a working state. Another condition for the fourth control sub-unit 615 to output the third control signal for enabling the signal detection and charge pump circuit may be added, which is that the signal detection and charge pump circuit is currently in the work stopping state. That is to say, when it is judged that the configured working mode is the second mode, the current output power obtained by the obtaining unit 600 is not less than the predetermined power value corresponding to the second mode, and the signal detection and charge pump circuit is currently in the work stopping state, a fifth control sub-unit 616 outputs the third control signal for enabling the signal detection and charge pump circuit. Here, the "not less than" may also be changed to "greater than".

The control unit 610 may include any one or more of the four groups of sub-units. On the basis that the control unit 610 includes the storage sub-unit 611 and the fourth control sub-unit 615, the control unit 610 may further include the fifth control sub-unit 616.

The fifth control sub-unit 616 is configured to: after the signal detection and charge pump circuit is disabled, for example, after the third control signal for disabling the signal detection and charge pump circuit is output, calculate the minimum undistorted power supply voltage provided for the line driver according to the current output power of the subscriber port, and output the first control signal according to the calculated minimum undistorted power supply voltage, so as to control the power supply voltage provided by the power source module for the line driver as the minimum undistorted power supply voltage calculated according to the current output power.

It should be noted that, the control unit 610 may include all of the storage sub-unit 611, the first control sub-unit 612, the second control sub-unit 613, the third control sub-unit 614, the fourth control sub-unit 615, and the fifth control sub-unit 616. In this case, the control unit 610 may reduce the energy consumption of the xDSL subscriber board to a greatest degree.

In the sixth embodiment, the obtaining unit 600 generates the control signal by obtaining at least one parameter of the working mode configured on the subscriber port of the xDSL subscriber board and the current output power of the subscriber port, so that the control unit 610 may output the control signal according to the obtained parameter. When the control unit 610 uses the control signal to control the minimum undistorted power supply voltage provided for the line driver, the phenomenon of unnecessary energy consumption waste caused by the too high voltage provided for the line driver may be avoided. When the control unit 610 uses the control signal to control the predetermined threshold level in the signal detection and charge pump circuit, the phenomenon that the power supply voltage of the line driver unnecessarily follows the waveform of the output signal or cannot follow the waveform of the output signal in time, which is caused by that different working modes correspond to the same predetermined threshold level, may be avoided. When the control unit 610 uses the control signal to control the enabling/disabling of the signal detection and charge pump circuit, the phenomenon of unnecessary energy consumption waste of the signal detection and charge pump circuit may be avoided. Therefore, through the sixth embodiment, the minimum undistorted power supply voltage provided for the line driver, the predetermined threshold level in the signal detection and charge pump circuit, or the enabling/disabling of the signal detection and charge pump circuit can be enabled to match at least one parameter of the working mode configured on the subscriber port and the current output power of the subscriber port, thus improving the power output efficiency of the xDSL subscriber board and eventually reducing the energy consumption of the xDSL subscriber board through the sixth embodiment.

Embodiment 7: xDSL subscriber board. A structure of the xDSL subscriber board is as shown in FIG. 7.

Figure 7:
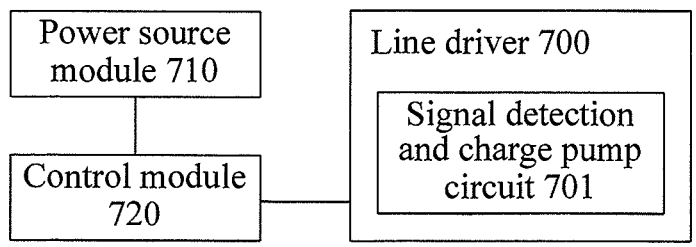
FIG. 7 is a schematic diagram of an xDSL subscriber board according to a seventh embodiment of the present invention.

The xDSL subscriber board in FIG. 7 includes: a line driver 700, a power source module 710, and a control module 720. The line driver 700 includes a signal detection and charge pump circuit 701. The line driver 700 may further include a class AB line driver connected to the signal detection and charge pump circuit 701.

The power source module 710 provides a minimum undistorted power supply voltage for the line driver 700.

The signal detection and charge pump circuit 701 detects a voltage swing of an input signal. When the voltage swing of the input signal exceeds a predetermined threshold level, the signal detection and charge pump circuit 701 linearly adjusts, according to a signal waveform of an excessive part, a power supply voltage of a line driver, for example, the class AB line driver, connected to the signal detection and charge pump circuit 701, so that a power supply voltage of the class AB line driver can follow a waveform of an output signal.

The control module 720 is configured to: obtain a current working parameter of the xDSL subscriber board, where the current working parameter includes at least one of a working mode configured on a subscriber port of the xDSL subscriber board and current output power of the subscriber port. The control module 720 determines a control signal for the line driver in the xDSL subscriber board according to the current working parameter, and outputs the control signal, where the control signal includes: a first control signal, a second control signal, or a third control signal. The first control signal is used to control a minimum undistorted power supply voltage provided by the power source module 710 for the line driver 700, that is, the first control signal controls the power source module 710 so that power source module 710 provides a corresponding power supply voltage for the line driver 700 according to the first control signal. The second control signal is used to control a predetermined threshold level in the signal detection and charge pump circuit 701, where the predetermined threshold level is a threshold value for enabling the power supply voltage of the class AB line driver to follow the waveform of the output signal. The third control signal is used to control enabling/disabling of the signal detection and charge pump circuit 701, that is, the third control signal controls whether the signal detection and charge pump circuit 701 needs to work.

The control module 720 may obtain the working mode configured on the subscriber port before the subscriber port of the xDSL subscriber board is initialized. If the xDSL subscriber board may change the working mode configured on the subscriber port in a working process and the changed configured working mode may be successfully activated in a normal working process, the control module 720 may obtain the working mode configured on the subscriber port at regular time. The control module 720 may obtain the current output power of the subscriber port in real time.

A principle for the control module 720 to determine the control signal for the line driver 700 in the xDSL subscriber board according to the obtained current working parameter may be: The control signal matches the current working parameter. That is, the control module 720 may output the first control signal according to a principle that the minimum undistorted power supply voltage provided for the line driver 700 matches the working mode configured on the subscriber port, the control module 720 may output the first control signal according to a principle that the power supply voltage provided for the line driver 700 matches the current output power of the subscriber port, the control module 720 may output the second control signal according to a principle that the predetermined threshold level in the signal detection and charge pump circuit 701 matches the working mode configured on the subscriber port, and the control module 720 may output the third control signal according to a principle that an enabling/disabling state of the signal detection and charge pump circuit 701 matches the working mode configured on the subscriber port. In this way, the control module 720 enables the control signal to match the current working parameter of the xDSL subscriber board, thus reducing unnecessary energy consumption of the xDSL subscriber board. Here, the unnecessary energy consumption may be incurred by unnecessary work of the signal detection and charge pump circuit 701, or by providing, by the power source module 710, a voltage which is higher than that required by the current output power for the line driver 700, or by unnecessarily enabling, by the signal detection and charge pump circuit 701 and according to the predetermined threshold level, the power supply voltage of the class AB line driver to follow the waveform of the output signal.

A structure of the control module 710 is as described in the sixth embodiment and is not described here again.

Figure 7A:
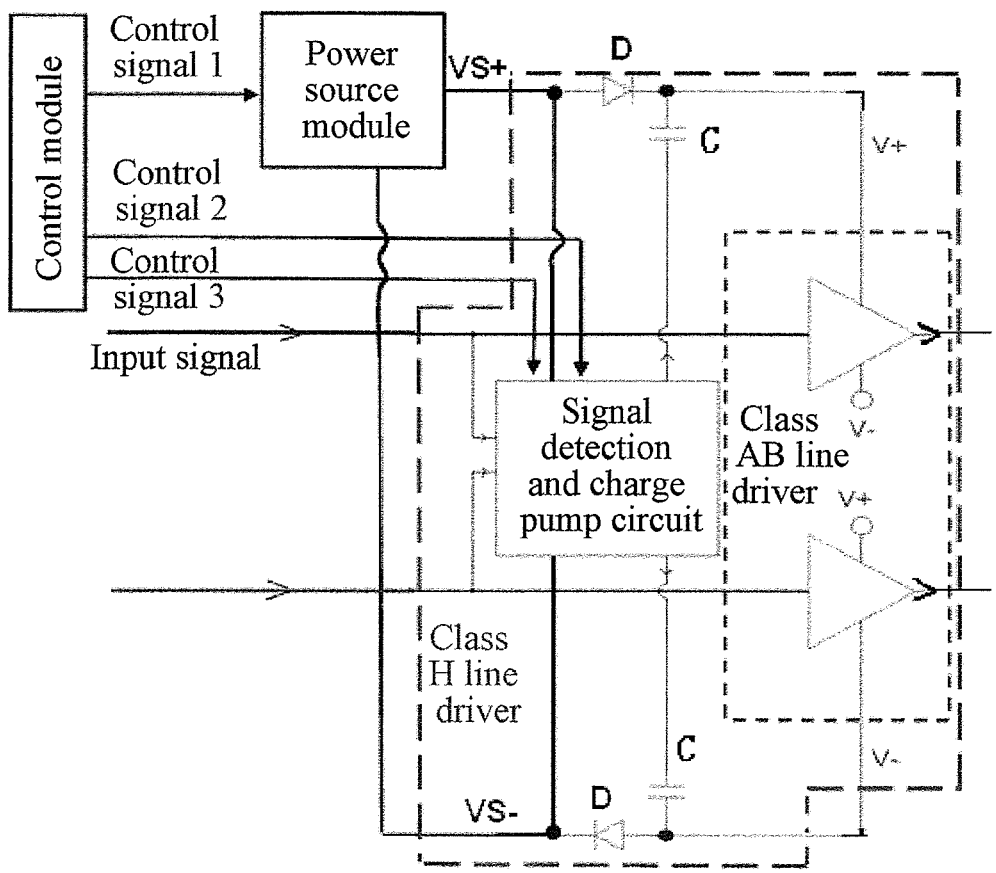
FIG. 7A is a schematic diagram of a VDSL2 subscriber board according to the seventh embodiment of the present invention.

In the case that the xDSL subscriber board is a VDSL2 subscriber board, a specific example of the VDSL2 subscriber board is as shown in FIG. 7A.

The VDSL2 subscriber board shown in FIG. 7A includes a control module, a power source module, and a class H line driver, where the class H line driver includes a signal detection and charge pump circuit, a class AB line driver, and a diode D. A control signal 1 output by the control module acts on the power source module, a control signal 2 and a control signal 3 that are output by the control module act on the signal detection and charge pump circuit. The VDSL2 subscriber board may also be of other forms, and the embodiment does not limit a specific structure of the VDSL2 subscriber board.

Through the foregoing description of the implementation, persons skilled in the art may clearly understand that the present invention may be implemented through software plus a necessary hardware platform or through hardware. But in many cases, the former is preferred implementation. Based on such understanding, all or part of the technical solutions of the present invention that makes contributions to the prior art may be embodied in the form of a software product. The software product may be used to execute the foregoing method procedures. The computer software product may be stored in a storage medium, such as a ROM/RAM, a magnetic disk, and an optical disk, and include several instructions used to enable a computer device (for example, a personal computer, a server, or a network device) to execute the method according to the embodiments of the present invention or some parts of the embodiments of the present invention.

Although the present invention is described through the embodiments, persons of ordinary skill in the art know that, various variations and changes may be made to the present invention without departing from the spirit of the present invention, and the claims of the application of the present invention covers the variations and changes.

What is claimed is:

1. A method for improving power output efficiency of a line driver, the method comprising:
   obtaining a current working parameter of an xDSL subscriber board, wherein the current working parameter comprises at least one of a working mode configured on a subscriber port of the xDSL subscriber board and current output power of the subscriber port; and
   determining, according to the current working parameter, a control signal that matches the current working parameter for a line driver in the xDSL subscriber board, and outputting the control signal, wherein the control signal comprises a first control signal, a second control signal, and a third control signal;
   the first control signal is used to control a power source module that provides a minimum undistorted power supply voltage according to the first control signal, wherein the minimum undistorted power supply voltage is a minimum voltage value for the line driver satisfying a voltage requirement of the line driver;
   the second control signal is used to control a predetermined threshold level in a signal detection and charge pump circuit of the line driver, the predetermined threshold level is a voltage threshold value of an input signal for enabling the power supply voltage of the line driver to follow a voltage waveform of an output signal;
   and the third control signal is used to control enabling or disabling of the signal detection and charge pump circuit.

2. The method according to claim 1, wherein determining, according to the current working parameter, the control signal that matches the current working parameter for the line driver in the xDSL subscriber board, and outputting the control signal comprises:
   before the subscriber port of the xDSL subscriber board is initialized, determining, according to a preset corresponding relationship between the working mode of the subscriber port and the minimum undistorted power supply voltage provided for the line driver, a minimum undistorted power supply voltage corresponding to the configured working mode, and outputting the first control signal according to the minimum undistorted power supply voltage corresponding to the configured working mode.

3. The method according to claim 1, wherein determining, according to the current working parameter, the control signal that matches the current working parameter for the line driver in the xDSL subscriber board, and outputting the control signal comprises:
   determining, according to a preset corresponding relationship between the working mode of the subscriber port and the predetermined threshold level in the signal detection and charge pump circuit, a predetermined threshold level corresponding to the configured working mode, and outputting the second control signal according to the predetermined threshold level corresponding to the configured working mode.

4. The method according to claim 1, wherein determining, according to the current working parameter, the control signal that matches the current working parameter for the line driver in the xDSL subscriber board, and outputting the control signal comprises at least one of the following steps:
   when the configured working mode is a first mode, outputting the third control signal for disabling the signal detection and charge pump circuit;
   when the configured working mode is a second mode and the current output power is less than a predetermined power value corresponding to the second mode, outputting the third control signal for disabling the signal detection and charge pump circuit; and
   when the configured working mode is a second mode and the current output power is not less than the predetermined power value corresponding to the second mode, outputting the third control signal for enabling the signal detection and charge pump circuit, wherein
   the second mode comprises at least one working mode, and each working mode comprised in the second mode corresponds to a different predetermined power value.

5. The method according to claim 4, wherein determining, according to the current working parameter, the control signal that matches the current working parameter for the line driver in the xDSL subscriber board, and outputting the control signal further comprises:
   after the signal detection and charge pump circuit is disabled, calculating the minimum undistorted power supply voltage provided for the line driver according to the current output power of the subscriber port, and outputting the first control signal according to the calculated minimum undistorted power supply voltage.

6. An apparatus for improving power output efficiency of a line driver, the apparatus comprising:
   an obtaining unit, configured to obtain a current working parameter of an xDSL subscriber board, wherein the current working parameter comprises at least one of a working mode configured on a subscriber port of the xDSL subscriber board and current output power of the subscriber port; and a control unit, configured to determine, according to the current working parameter, a control signal that matches the current working parameter for a line driver in the xDSL subscriber board, and output the control signal, wherein the control signal comprises a first control signal, a second control signal, and a third control signal;

the first control signal is used to a power source module that provides a minimum undistorted power supply voltage according to the first control signal, wherein the minimum undistorted power supply voltage is a minimum voltage value for the line driver satisfying a voltage requirement of the line driver;

the second control signal is used to control a predetermined threshold level in a signal detection and charge pump circuit of the line driver, the predetermined threshold level is a voltage threshold value of an input signal for enabling the power supply voltage of the line driver to follow a voltage waveform of an output signal; and the third control signal is used to control enabling or disabling of the signal detection and charge pump circuit.

7. The apparatus according to claim 6, wherein the control unit comprises:

a storage sub-unit, configured to store a corresponding relationship between the working mode of the subscriber port and the minimum undistorted power supply voltage provided for the line driver; and a first control sub-unit, configured to, before the subscriber port of the xDSL subscriber board is initialized, determine, according to the corresponding relationship stored in the storage sub-unit, a minimum undistorted power supply voltage corresponding to the configured working mode, and output the first control signal according to the minimum undistorted power supply voltage corresponding to the configured working mode.

8. The apparatus according to claim 6, wherein the control unit comprises:

a storage sub-unit, configured to store a corresponding relationship between the working mode of the subscriber port and the predetermined threshold level in the signal detection and charge pump circuit; and a second control sub-unit, configured to determine, according to the corresponding relationship stored in the storage sub-unit, a predetermined threshold level corresponding to the configured working mode, and output the second control signal according to the predetermined threshold level corresponding to the configured working mode.

9. The apparatus according to claim 6, wherein the control unit comprises:

a third control sub-unit, configured to, when the configured working mode is a first mode, output the third control signal for disabling the signal detection and charge pump circuit; and/or a storage sub-unit, configured to store a corresponding relationship between the working mode of the subscriber port and the predetermined power value; and a fourth control sub-unit, configured to: when the configured working mode is a second mode and it is determined, according to the corresponding relationship stored in the storage sub-unit, that the current output power is less than a predetermined power value corresponding to the second mode, output the third control signal for disabling the signal detection and charge pump circuit; and when the configured working mode is the second mode and the current output power is not less than the predetermined power value corresponding to the second mode, output the third control signal for enabling the signal detection and charge pump circuit, wherein the second mode comprises at least one working mode, and each working mode comprised in the second mode corresponds to a different predetermined power value.

10. The apparatus according to claim 9, wherein the control unit further comprises:

a fifth control sub-unit, configured to: after the signal detection and charge pump circuit is disabled, calculate the minimum undistorted power supply voltage provided for the line driver according to the current output power, and output the first control signal according to the calculated minimum undistorted power supply voltage.

11. An xDSL subscriber board, comprising a line driver and a power source module, wherein the line driver comprises a signal detection and charge pump circuit, the power source module provides a minimum undistorted voltage for the line driver, the subscriber board further comprising:

a control module, configured to: obtain a current working parameter of the xDSL subscriber board, wherein the current working parameter comprises at least one of a working mode configured on a subscriber port of the xDSL subscriber board and current output power of the subscriber port; and determine, according to the current working parameter, a control signal that matches the current working parameter for a line driver in the xDSL subscriber board, and output the control signal, wherein the control signal comprises a first control signal, a second control signal, and a third control signal;

the first control signal is used to control a power source module that provides a minimum undistorted power supply voltage according to the first control signal, wherein minimum undistorted power supply voltage is a minimum voltage value for the line driver satisfying a voltage requirement of the line driver;

the second control signal is used to control a predetermined threshold level in the signal detection and charge pump circuit, the predetermined threshold level is a voltage threshold value of an input signal for enabling the power supply voltage of the line driver to follow a voltage waveform of an output signal; and the third control signal is used to control enabling or disabling of the signal detection and charge pump circuit.

* * * * *